United States Patent

Nishiuchi et al.

[11] Patent Number: 5,517,485
[45] Date of Patent: May 14, 1996

[54] OPTICAL INFORMATION RECORDING MEDIUM HAVING FIRST AND SECOND TRACKS AND APPARATUS FOR RECORDING TO AND REPRODUCING FROM THE MEDIUM

[75] Inventors: Kenichi Nishiuchi, Moriguchi; Nobuo Akahira, Yawata; Noboru Yamada, Hirakata; Eiji Ohno, Hirakata, all of Japan

[73] Assignee: Matsushita Electric Industrial Co., Ltd., Osaka, Japan

[21] Appl. No.: 202,442

[22] Filed: Feb. 28, 1994

[30] Foreign Application Priority Data

Feb. 26, 1993 [JP] Japan ..................... 5-037642
Mar. 25, 1993 [JP] Japan ..................... 5-066320

[51] Int. Cl.⁶ ............................................. G11B 7/24
[52] U.S. Cl. ........................... 369/275.3; 369/275.4
[58] Field of Search ..................... 369/275.4, 275.3, 369/275.1, 275.2, 274, 276, 277, 279; 428/64, 65; 346/76 L, 135.1, 137; 430/321, 320

[56] References Cited

U.S. PATENT DOCUMENTS

| | | | |
|---|---|---|---|
| 4,985,616 | 1/1991 | Nakamura et al. | 369/275.3 |
| 5,214,635 | 5/1993 | Satoh et al. | 369/275.2 |
| 5,383,176 | 1/1995 | Inui et al. | 369/275.4 |
| 5,399,461 | 3/1995 | Van et al. | 369/275.4 |
| 5,406,545 | 4/1995 | Kadowaki | 369/275.3 |
| 5,407,720 | 4/1995 | Omata | 369/275.1 |

Primary Examiner—Georgia Y. Epps
Assistant Examiner—Tan Dinh
Attorney, Agent, or Firm—Ratner & Prestia

[57] ABSTRACT

An optical information recording medium includes: a substrate including first tracks having a first face and second tracks having a second face, the first face and the second face being optically at different positions in a direction of an incident light beam; and a recording layer provided on the substrate on which an optically detectable change is caused by irradiating the light beam; wherein the first and second tracks have an information recording area and an address area having a control information for the information recording area in a direction of the tracks, the address area has address pits in a part of the first tracks, the address pits being formed in a pattern according to specified code signals, and the information recording area has an portion on which information is recorded, the portion including at least the second tracks.

26 Claims, 19 Drawing Sheets

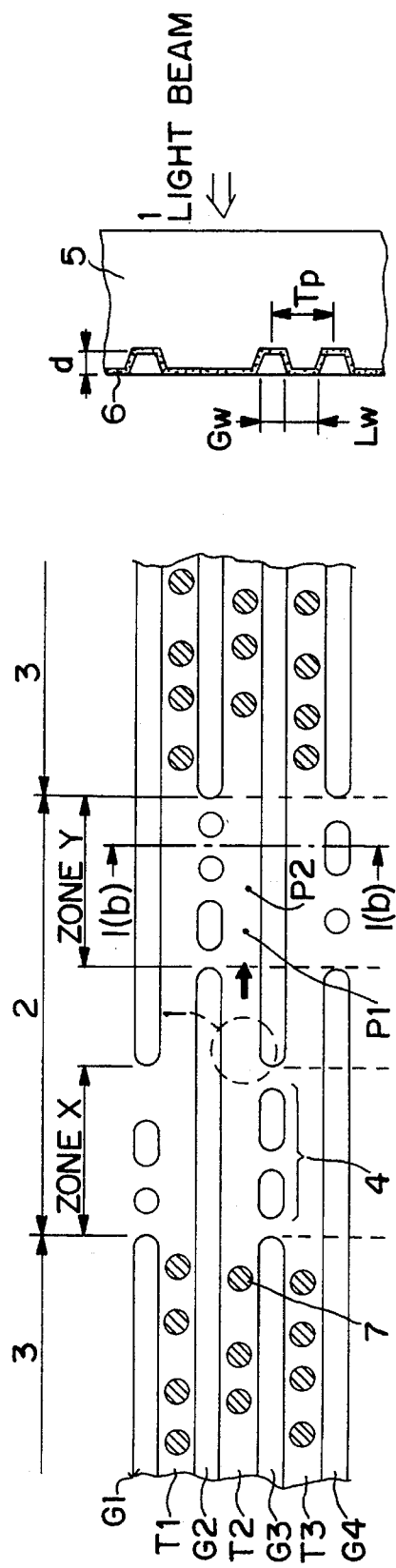
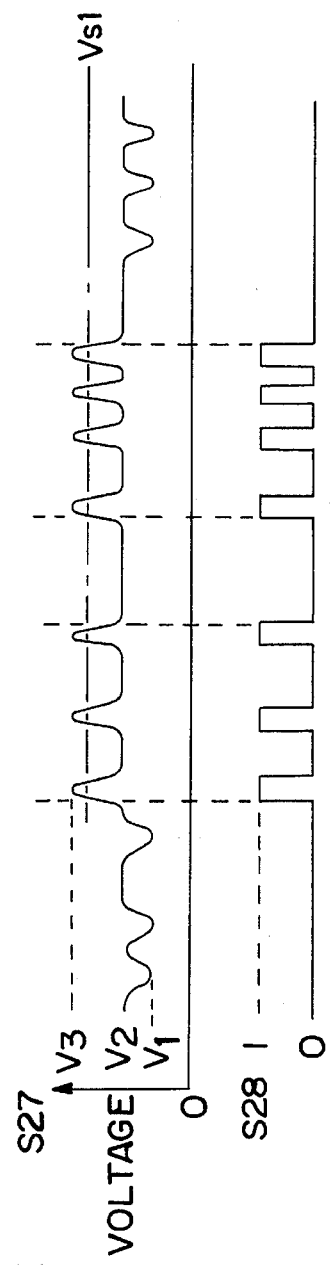
FIG.1(a)
FIG.1(b)
FIG.1(c)

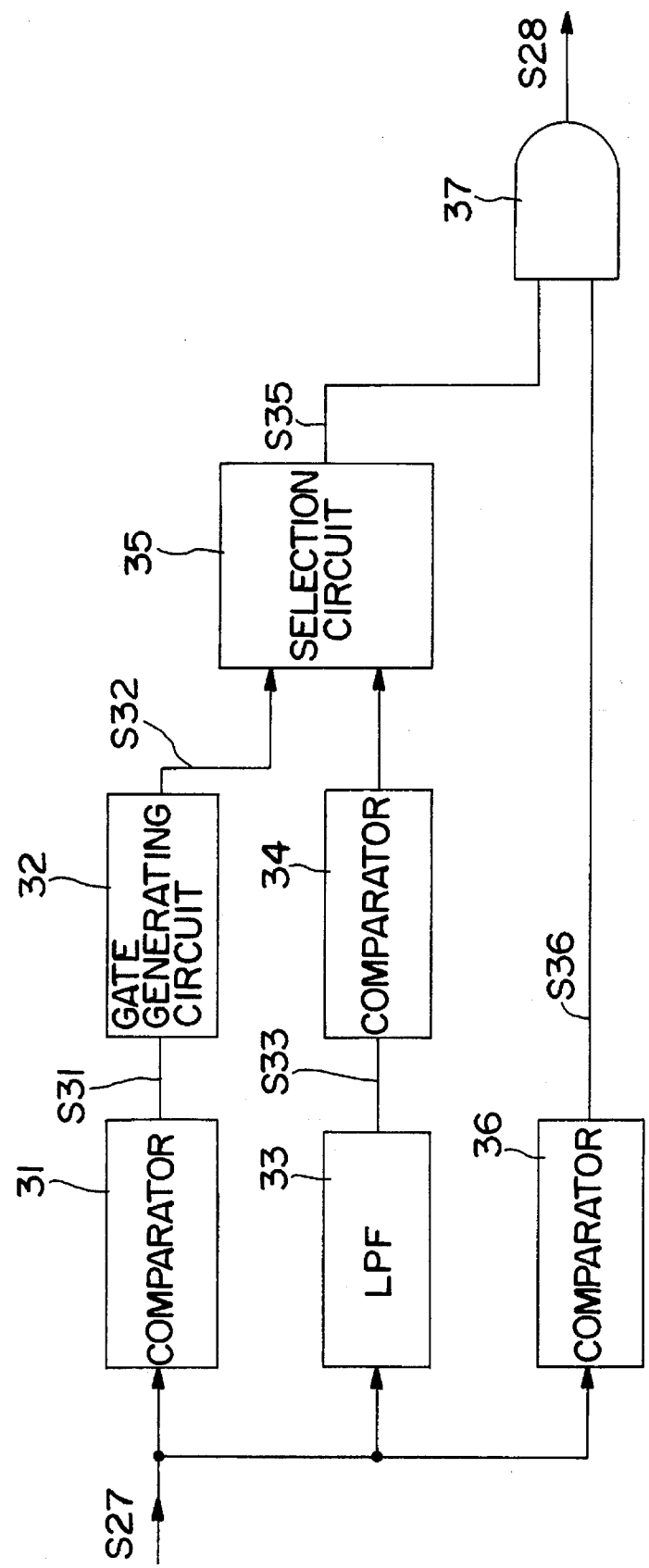
F I G. 5

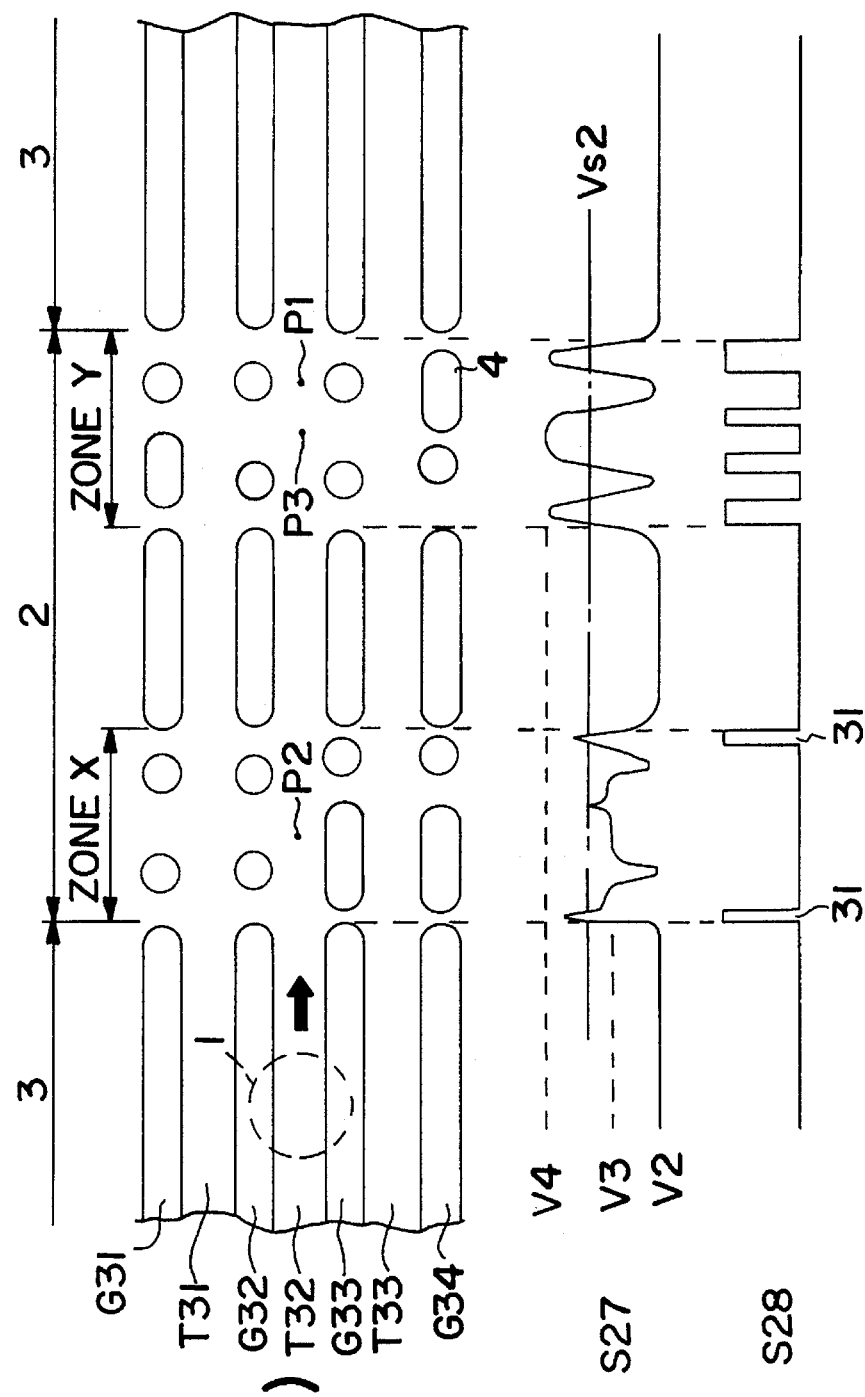

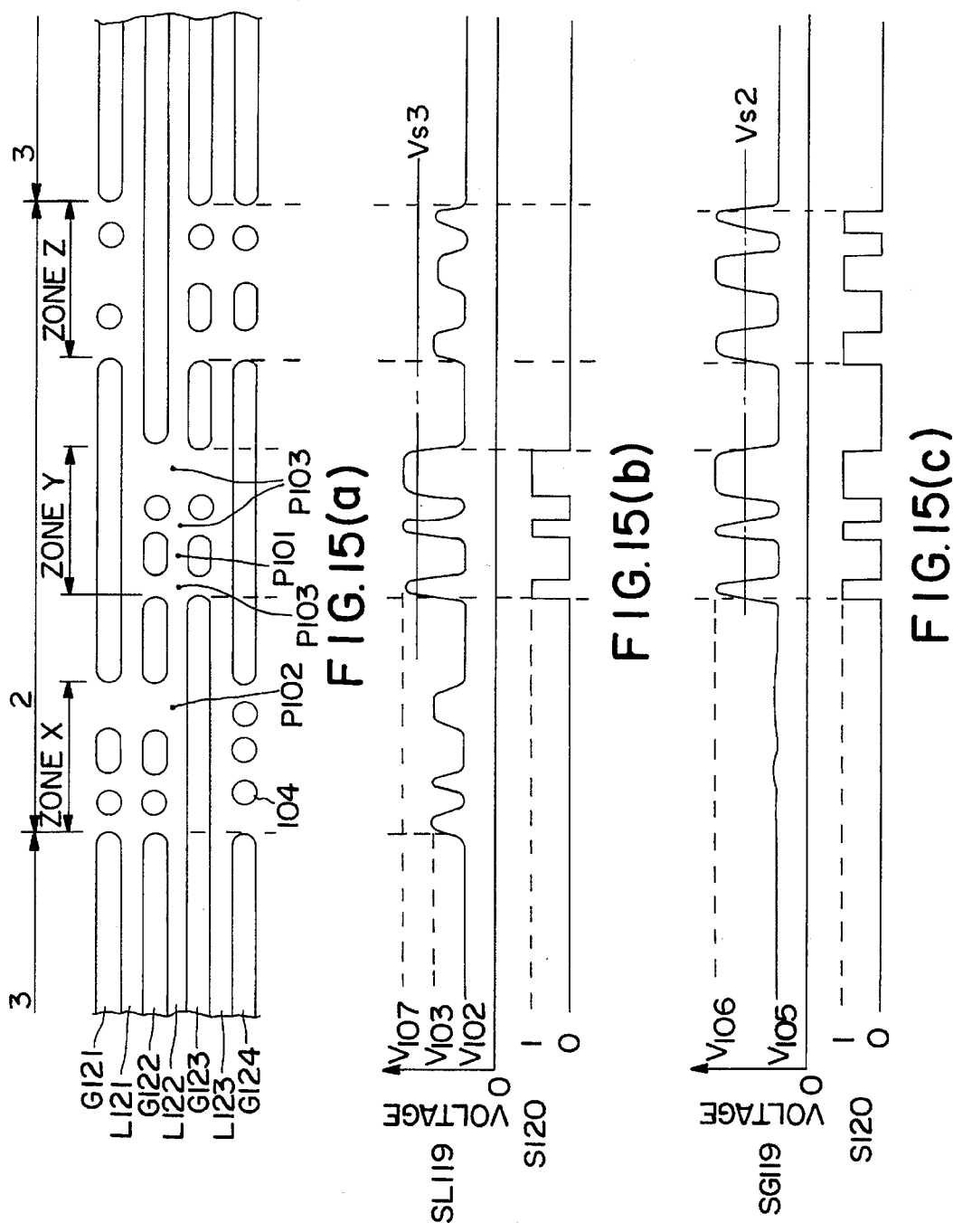

5,517,485

OPTICAL INFORMATION RECORDING MEDIUM HAVING FIRST AND SECOND TRACKS AND APPARATUS FOR RECORDING TO AND REPRODUCING FROM THE MEDIUM

BACKGROUND OF THE INVENTION

1. Field of the Invention

The present invention relates to an information recording medium on and from which information can be recorded and reproduced by means of a light beam, and particularly to a recording medium which is capable of achieving a high track density and a recording/reproducing apparatus therefor.

2. Description of the Related Art

Optical disk, optical card and optical tape have been known as the media capable of recording or reproducing information by means of optical processes. On most of these media, information is recorded by applying a laser beam focused to a tiny spot by means of a lens onto a thin recording film of the media. An optical disk, among them, has a disk substrate having guide tracks comprising bumps and recesses being formed in a spiral or concentric configuration and a thin recording film formed thereon. In such a disk, information is recorded or reproduced by irradiating the laser beam along the track.

A conventional optical disk will be described below with reference to FIGS. 17(a)–(c) and 18(a)–(c). Recording signals on a recording medium or reproducing signals therefrom require control information to search for a recordable area on the recording medium or to locate the position where desired information is recorded. For this purpose, an optical disk has an address area to control the information recording area for a specified period of the track on the disk. The address area may be either of two types; recording the information signals on bumps of the guide track, or recording them in recesses. Faces projecting toward the incident light beam are called grooves, and recording on the projecting faces is called groove recording. Faces which are recessed are called lands, and recording on the recessed faces is called land recording. FIGS. 17(a)–(c) and 18(a)–(c) illustrate typical constitutions of the respective types.

FIG. 17(a) shows an enlarged example of a vicinity of an address area of a recording medium used in groove recording, while FIG. 17(b) showing a cross sectional view of the medium taken along a line 17(b)—17(b) of FIG. 17(a), and FIG. 17(c) showing a cross sectional view of the center of a recording track taken along a line 17(c)—17(c) of FIG. 17(a). As shown in FIG. 17(a), the recording medium includes an address area 2 and an information recording area (hereinafter, called information area) 3. The address area 2 is formed on information guide tracks separated from the information area 3. As shown in FIG. 17(b) and 17(c), the address area 2 and the information area 3 consist of grooves 141 and lands 142. A recording mark 7 corresponding to the information signal to be recorded is formed on the groove 141. Address pits 143 representing the address signal are provided in such a manner as to interrupt the grooves 141.

FIG. 18(a) shows a pattern of address pits in the case of land recording, while FIG. 18(b) showing a cross sectional view of the medium taken along a line 18(b)—18(b) of FIG. 18(a), and FIG. 18(c) showing a cross sectional view of the center of a recording track taken along a line 18(c)—18(c) of FIG. 18(a). This recording medium also includes an address area 2 and an information recording area 3 separated therefrom. The address area 2 and the information area 3 consist of grooves 151 and lands 152. In this case, recording marks 153 are formed on the recessed land 152 with respect to the laser beam 1. In the address area 2, address pits 154 are formed in the form of bumps and recesses in the same track as the recording marks 153.

As shown in FIGS. 17(a)–(c) and 18(a)–(c), address pits are formed on the center line of the track wherein information signals are recorded, in either of land recording and groove recording. When demodulating the information signals, changes in the intensity of the light reflecting on the address pits are demodulated as the address information to locate the recording position of the information signal on the optical disk, thereby enabling it to record and reproduce the information at a particular position.

A method of manufacturing a substrate provided with address pits will be described below with reference to FIGS. 19(a)–(c). FIG. 19(a) shows a flow chart of the method and FIG. 19(b) shows a schematic view illustrating the processes of groove recording. FIG. 19(c) shows a schematic view illustrating the processes of land recording, which is different from those of groove recording. The manufacturing process includes a mastering process to make a master disk having an inverted impression of the required substrate surface configuration and a replication process to form substrates from the master disk.

The mastering process will be described below. First, a flat glass plate 161 is coated with a photoresist 162 and is rotated while a spiral pattern is printed thereon by exposing the plate 161 to an Ar laser beam. For the groove recording shown in FIG. 17(a), for example, a single Ar laser beam 163 of a constant output power is applied to form the guide tracks of the information recording section, as shown in FIG. 19(b). In the address area, the laser power is modulated in a specified pattern to expose the area corresponding to the address to the laser beam 163. In land recording, as shown in FIG. 19(c), two laser beams 164 and 165 spaced by ½ of the track pitch in the tracking direction are used. The first laser beam 164 is used for forming the tracks while the second laser beam 165 is modulated in the specified pattern to record the address signal. Then, the photoresist 162 is removed from the exposed portions 166, 167 and 168 in a development process. A nickel layer 169 is formed on the surface in a plating process, and finally the nickel layer 169 is peeled off the glass plate 161, thereby obtaining a master disk 170 which has bumps and recesses on the surface.

The replication process will be described below. Various methods are used according to the substrate material. To manufacture optical disks, an injection molding method is predominantly employed because it is suited to mass production. In the injection molding method, the master disk 170 obtained in the mastering process is set in a mold 171 installed in an injection molding machine and a resin 172 is injected therein, thereby obtaining a resin substrate 173 having the specified tracks of bumps and recesses. A thin recording film is formed on the resin substrate to obtain an optical disk as a recording medium capable of recording information.

As described above, address areas can be formed for the control information of the recording medium capable of optically recording and reproducing information. However, using such optical disks in wide applications such as recording large amount of data or image information requires a higher recording density. Recording density may be increased by employing a laser of a shorter wavelength or a light converging lens having a larger numerical aperture.

Because this method enables making the light spot smaller, it is capable of not only increasing the recording density in the direction of the track but also decreasing the track pitch. The optical disk currently in use has a track pitch of Tp=1.6 µm and a guide track width about a half thereof with a depth of about 50 nm. However, when the light spot is made smaller and the track pitch is accordingly decreased to 1.0 µm or less, for example, for higher recording density, such problems as described below arise.

A master disk having a track pitch of 1.0 µm or less can be made in the mastering process described above. It is also possible to increase the density further by employing a laser of a shorter wavelength to which the photoresist is exposed. The requirement for the configuration of the substrate in view of the recording characteristics in the case of a small track pitch of the guide track is to make the track width in a portion, where the recording marks are formed, as large as possible to maintain the signal amplitude. Therefore, groove width is made larger on a substrate for groove recording, and the land width is made larger on a substrate for land recording. However, transfer performance of the injection molding process becomes poorer as the track pitch becomes smaller. The transfer performance refers to the degree of accuracy in reproducing the surface configuration of the master disk onto the resin substrate obtained by the injection molding. In the injection molding process, molten resin is poured into a mold and the configuration of the master disk is transferred onto the resin substrate by means of the injection pressure. Thus, when the width of the recess of the master disk, namely the land, wherein the resin is injected is decreased, the transfer performance becomes poorer.

Problems which arise when the track pitch is decreased will be described below with reference to FIG. 20 which illustrates a cross sectional view of an injection molding machine. A substrate for groove recording will be taken as an example. When the track pitch Tp is decreased while maintaining the groove width Gw, narrower land between bumps, namely the track 174 on the master disk, must be filled with the resin as shown in FIG. 20. This requires large equipment having a very high injection pressure.

Similarly on a substrate for land recording, smaller track pitch causes the width of the land area 155 on both sides of the address pit shown in FIG. 18 to become excessively small, making the injection molding difficult.

SUMMARY OF THE INVENTION

The optical information recording medium of this invention comprises: a substrate including first tracks having a first face and second tracks having a second face, the first face and the second face being optically at different positions in a direction of an incident light beam; and a recording layer provided on the substrate on which at least one optically detectable change is caused by irradiating the light beam; wherein the first and second tracks have an information recording area and an address area having a control information for the information recording area in a direction of the tracks, the address area comprises address pits in a part of the first tracks, the address pits being formed in a pattern according to specified code signals, and the information recording area has a portion on which information is recorded, the portion including at least the second tracks.

According to another aspect of the present invention, an optical information recording medium comprises: a substrate including first tracks having a first face and second tracks having a second face, the first face and the second face being optically at different positions in a direction of an incident light beam; and a recording layer provided on the substrate on which at least one optically detectable change is caused by irradiating the light beam; wherein the first and second tracks have an information recording area and an address area having a control information for the information recording area in a direction of the tracks, the address area comprises address pits in a part of the first tracks, the address pits being formed in a pattern according to specified code signals, a track pitch of the first tracks is smaller than 1.2 µm, and a width of the first tracks is smaller than a width of the second tracks.

According to still another aspect of the present invention, an optical information recording medium comprises: a substrate including first tracks having a first face and second tracks having a second face, the first face and the second face being optically at different positions in a direction of an incident light beam; and a recording layer provided on the substrate on which at least one optically detectable change is caused by irradiating the light beam; wherein the first and second tracks have an information recording area and an address area having a control information for the information recording area in a direction of the tracks, the address area comprises address pits in a part of the first tracks, the address pits being formed in a pattern according to specified code signals, the address area includes at least two zones located in the direction of the tracks, and in the address area, a pattern of the address pits of the first track in at least one of the zones is identical to a pattern of the next first track.

According to still another aspect of the present invention, an optical information recording medium comprises: a substrate including first tracks having a first face and second tracks having a second face, the first face and the second face being optically at different positions in a direction of an incident light beam, both of the first and second tracks being used for recording information; and a recording layer provided on the substrate on which at least one optically detectable change is caused by irradiating the light beam; wherein the first and second tracks have an information recording area and an address area having a control information for the information recording area in a direction of the tracks, a width of the first tracks is identical to a width of the second tracks, and the address area comprises address pits in a part of the first tracks, the address pits being formed in a pattern according to specified code signals.

The optical information recording/reproducing apparatus of this invention reproducing an information signal by irradiating a laser light beam onto a recording medium, the recording medium comprises: a substrate including first tracks having a first face and second tracks having a second face, the first face and the second face being optically at different positions in a direction of an incident light beam; and a recording layer provided on the substrate on which at least one optically detectable change is caused by irradiating the light beam; wherein the first and second tracks have an information recording area and an address area having a control information for the information recording area in a direction of the tracks, and the address area comprises address pits in a part of the first tracks, the address pits being formed in a pattern according to specified code signals, the apparatus comprising: light detecting means for detecting a reflected light from the recording medium; tracking means for focusing the incident light beam onto the second track between the first tracks having the address pits based on an output from the light detecting means; and address demodulating means for demodulating an address signal from the address pits formed in the address area by comparing the output from the light detecting means with a reference level.

According to another aspect of the present invention, an optical information recording/reproducing apparatus reproducing an information signal by irradiating a laser light beam onto a recording medium, the recording medium comprising: a substrate including first tracks having a first face and second tracks having a second face, the first face and the second face being optically at different positions in a direction of an incident light beam; and a recording layer provided on the substrate on which at least one optically detectable change is caused by irradiating the light beam; wherein the first and second tracks have an information recording area and an address area having a control information for the information recording area in a direction of the tracks, and the address area comprises address pits in a part of the first tracks, the address pits being formed in a pattern according to specified code signals, the apparatus comprises: light detecting means for detecting a reflected light from the recording medium, the detecting means divided in a direction perpendicular to the direction of the tracks; tracking means for focusing the incident light beam onto the second track based on an output from the light detecting means; summing means for obtaining a summation signal of the outputs from the light detecting means; differential means for obtaining a differential signal of the outputs from the light detecting means; absolute value means for obtaining an absolute value signal of an output from the differential means; address demodulating means for demodulating an address signal by comparing an output from the absolute value means with a first reference level; and information demodulating means for demodulating an information recorded on the recording layer by comparing a differential signal between an output from the summing means and the output from the absolute value means with a second reference level.

According to still another aspect of the present invention, an optical information recording/reproducing apparatus reproducing an information signal by irradiating a laser light beam onto a recording medium, the recording medium comprising: a substrate including first tracks having a first face and second tracks having a second face, the first face and the second face being optically at different positions in a direction of an incident light beam, both of the first and second tracks being used for recording information; and a recording layer provided on the substrate on which at least one optically detectable change is caused by irradiating the light beam; wherein the first and second tracks have an information recording area and an address area having a control information for the information recording area in a direction of the tracks, a width of the first tracks is identical to a width of the second tracks, and the address area comprises address pits in a part of the first tracks, the address pits being formed in a pattern according to specified code signals, the apparatus comprises: an optical system for irradiating the light beam on the recording medium; tracking error detecting means for detecting an offset between the target track and the light beam based on a reflected light or a transmitted light from the recording medium; tracking controlling means for moving the incident light beam to scan the track based on an output from the tracking error detecting means; inverting means for inverting a polarity of the tracking controlling means dependent on whether the first tracks or the second tracks are scanned; signal level comparing means having a reference level, the reference level changing into at least two levels in accordance with the inverted polarity through the inverting means; and address demodulating means for demodulating an address signal from an output from the signal level comparing means.

Thus, the invention described herein makes possible the advantage of providing a recording medium having guide tracks of high track density and address information and a recording/reproducing apparatus therefor.

This and other advantages of the present invention will become apparent to those skilled in the art upon reading and understanding the following detailed description with reference to the accompanying figures.

BRIEF DESCRIPTION OF THE DRAWINGS

FIGS. 1(a)–(c) show the constitution of a vicinity of an address area of an optical information recording medium and a waveform of a reproduced signal in the first embodiment of the invention.

FIG. 5 shows a block circuit diagram illustrative of the constitution of a comparator circuit of the recording/reproducing apparatus of the second embodiment.

FIGS. 6(a)–(b) show the constitution of a vicinity of an address area of an optical information recording medium and a waveform of a reproduced signal in the third embodiment.

FIGS. 15(a)–(c) show the constitution of a vicinity of an address area of an optical information recording medium and a waveform of a reproduced signal in the eighth embodiment.

DESCRIPTION OF THE PREFERRED EMBODIMENTS

Figure 2:
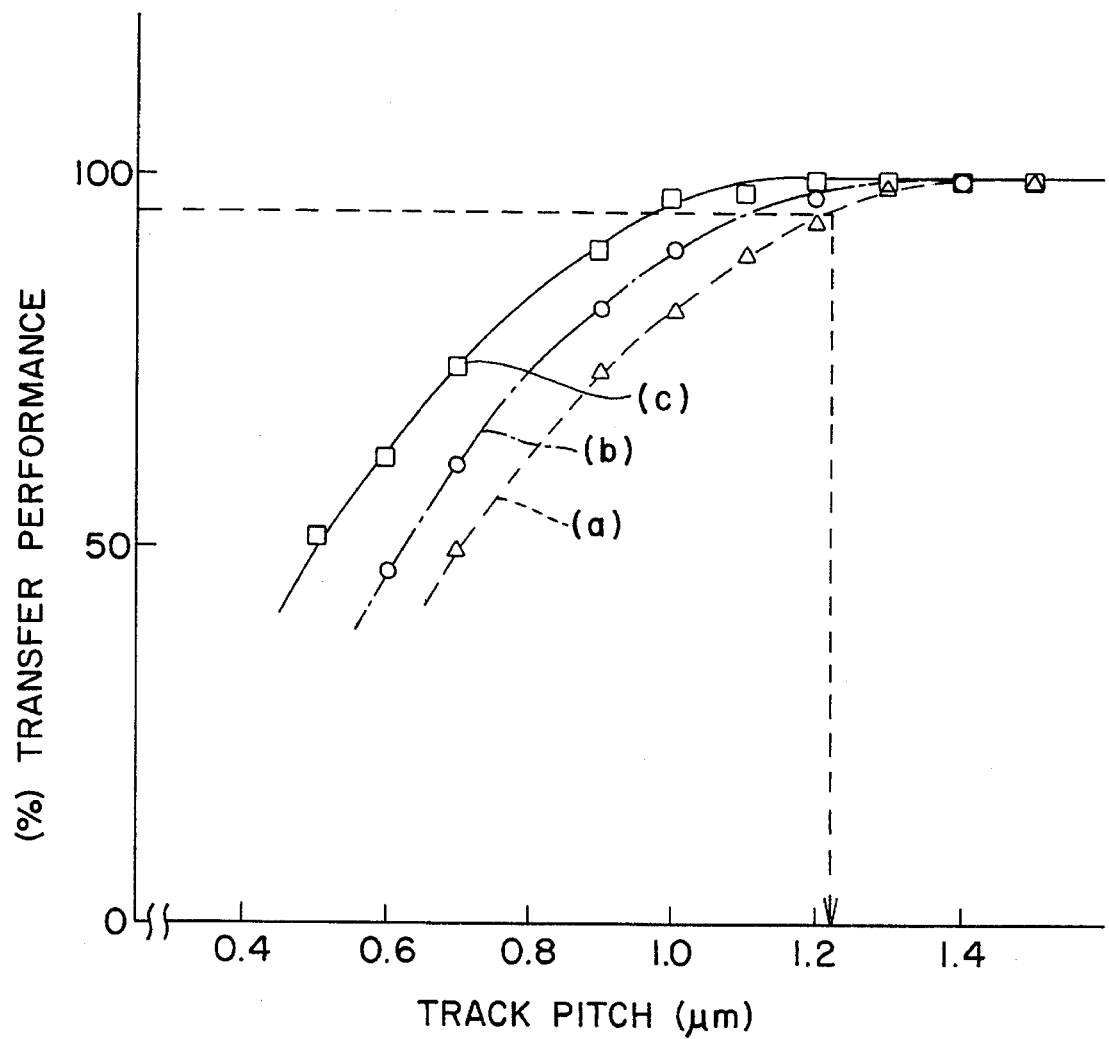
FIG. 2 shows a characteristics diagram illustrative of the track pitch dependency of the first embodiment.

FIG. 1(a) shows an enlarged plan view of a vicinity of an address area of the optical information recording medium of the invention, FIG. 1(b) shows a cross sectional view of the address area taken along a line 1(b)—1(b) of FIG. 1(a), and FIG. 1(c) shows a reproduced signal waveform obtained when a light beam 1 passes over a track T2 and a signal waveform after digitization.

A surface of a substrate 5 which is transparent for the wavelength of the light beam 1 which records or reproduces the information signals has guide tracks comprising bumps and recesses having faces at different positions in the direction of the incident light beam 1. Configurations of grooves G1 through G4 forming the bumps and recesses are similar to that of the substrate used in the above-mentioned conventional recording medium for the groove recording. The recording medium includes address areas 2 and information areas 3. The address areas 2 are arranged at constant intervals so that the same amount of information can be recorded in each information area 3 between the address areas 2. The address area 2 consists of a zone X and a zone Y having different positions in the track direction between adjacent tracks. In the address areas 2, address pits 4 are formed by interrupting the grooves in a pattern according to specified code signals in either of zones X and Y. For grooves G1 and G3, an address pattern is made in zone X and, for grooves G2 and G4, an address pattern is made in zone Y.

FIG. 1(c) of FIG. 1 shows the change in the reproduced output obtained when reflecting light from light irradiating point is detected by a light detector as the light beam 1 passes over the track T2 at the land section of the recording medium. In the address area 2, light incident to an optical system has a low intensity due to diffraction by tracks on both sides at point P1 where there are grooves G2, G3 on both sides, similarly to the information area 3, resulting in reproduced output of V2. At a point P2 where there is a groove G3 on one side, a voltage V3 higher than at the point P1 is obtained because the incident light experiences less diffraction. This change in the light intensity is demodulated to reproduce the address signal.

According to the invention, as described above, address pits are formed by providing the grooves intermittently without forming address pits in the land area. Consequently, a substrate for land recording can be made in the mastering process employing a single laser beam used in the conventional groove recording. The problem in the conventional recording medium related to the width of the land area during injection molding can also be solved by making it relatively large, namely making the width of the groove Gw small, in the case of decreased track pitch.

The invention has a remarkable effect under a narrow track condition wherein the track pitch is 1.2 µm or smaller. This effect will be described below with reference to FIG. 2. FIG. 2 shows the track pitch dependency of the transfer performance of a substrate obtained by injection molding. Transfer performance is represented by the ratio of track depth obtained after injection molding to the track depth of the master disk. In FIG. 2, (a), (b) and (c) show the measurements when the groove width Gw and the land width Lw are in relationships Gw=Lw+0.1 µm, Gw=Lw, and Gw=Lw−0.1 µm, respectively. Curve (a) corresponds to a conventional recording medium for groove recording wherein the width of the information recording track is kept large even when the track pitch is made small. Curve (c) shows a case in which the invention is applied wherein the width of the groove forming the address area is made small and the width of the land forming the information area is made large.

In this case, polycarbonate resin is used in the injection molding process and a master disk is made in the mastering process employing a light exposure apparatus provided with a single Ar laser light source shown in the description of the conventional process. A groove depth d is set to about $\lambda/(8n)$ with n representing the refraction coefficient of the material used in the injection molding and $\lambda$ representing the wavelength of light used in the recording and reproducing. This is because such a depth maximizes the servo signal used in the tracking control which is desirable. Specifically, the wavelength of the light used is set to 780 nm, the refractive coefficient of polycarbonate resin is set to 1.6, and the groove depth of the master disk is set to 50 nm.

By comparing in FIG. 2 on the basis of transfer performance 95%, for example, the track pitch in the conventional groove recording shown in curve (a) is limited to 1.2 µm, while track pitch down to 1.0 µm can be formed according to the invention as shown in curve (c). As described above, the invention has a remarkable effect under track conditions having a track pitch smaller than 1.2 µm. This effect is made even more remarkable when the difference between the groove width Gw and the land width Lw is increased.

An identifier to discriminate a recording medium according to the invention from a conventional recording medium is provided in a particular area of the disk. When the recording medium is loaded on a recording/reproducing apparatus, polarity of the tracking i.e., groove recording or land recording, can be determined by checking the identifier. The identifier may be formed either on part of the cartridge which protects the optical disk or in a pit pattern similar to the address pits on the inner or outer area of the information area of the optical disk. The identifier enables it to recognize that the address pits are formed in a pattern different from that of the conventional groove recording or that of the land recording on the recording medium, that the address area comprises a plurality of zones, and that the lands form the information track.

Although a method of forming the address pits by intermittently providing the grooves comprising projecting faces toward the incident light have been described, similar effects can also be obtained by interrupting the lands to form address pits and recording the information on grooves.

Also it is made possible to demodulate the address signal on both tracks while recording the signal on both tracks by setting the groove width approximately equal to the land width.

Now the invention will be described in detail below, drawing on particular constitutions.

EMBODIMENT 1

The material for the substrate is preferably optically transparent to the light beam of the wavelength used in recording and reproduction, for example polycarbonate, polymethyl methacrylate (PMMA) and glass. The substrate 5 is made of polycarbonate in the constitution shown in FIGS. 1(a)–(c). The grooves are made to have a track pitch Tp=1.1 μm, a groove width Gw=0.4 μm, and a depth d=50 nm. The substrate of the constitution described above is made with an injection molding machine from a master disk made in the mastering process employing a light exposure apparatus provided with a single Ar laser light source shown in the description of the related art. A recording layer 6 is formed on the surface by laminating a dielectric layer made of $Zn-SiO_2$ of a thickness of 110 nm, a phase change recording layer made of GeSbTe of a thickness of 25 nm, a dielectric layer made of $Zn-SiO_2$ of a thickness of 20 nm and a reflection layer made of Au of a thickness of 50 nm successively. The initial reflection factor of the recording layer is 30%, and the reflection factor after the recording mark 7 is formed is 10%.

Figure 3:
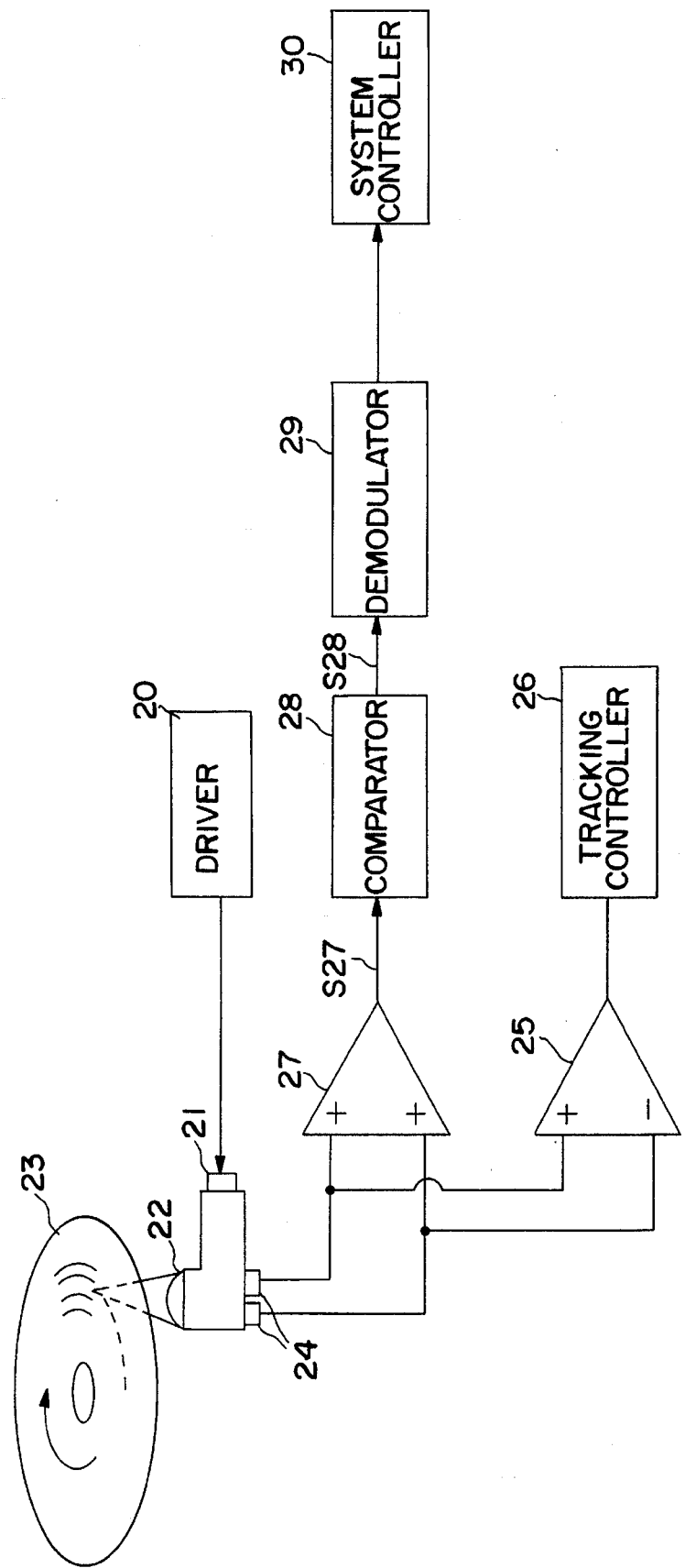
FIG. 3 shows a block circuit diagram illustrative of the constitution of a recording/reproducing apparatus of the first embodiment.

Constitution of the signal recording/reproducing apparatus according to the invention is shown in FIG. 3. The signal recording/reproducing apparatus includes an optical system having a laser drive circuit 20, a laser light source (wavelength 780 nm) 21, and an objective lens (NA=0.55) 22. By means of the optical system a light beam is irradiated onto the recording medium 23 which is rotating. Specifically, the laser light source 21 emits a light beam with a constant power (1 mW) under the operation of a laser drive circuit 20, and an objective lens 22 to focus the light beam, whereby the rotating recording medium 23 is irradiate with the light beam.

The signal recording/reproducing apparatus further includes a light detector 24, a differential amplifier 25 to input an output from the light detector 24, a tracking controller 26 to input an output from the differential amplifier 25, an amplifier 27 to input an output from the light detector 24, a comparator 28 connected with the amplifier 27, a demodulator 29 connected with the comparator 28, and a system controller 30 connected with the demodulator 29. The light detector 24 is divided into two parts in a direction perpendicular to the track and detects the reflected light. The difference of the two outputs of the light detector 24 is amplified by the differential amplifier 25, and the tracking controller 26 is made to operate based on the difference signal, thereby enabling it to track the light beam on the land of the recording medium 23. As a result, it is made possible to detect the change in the light intensity reflecting from a particular track.

The light detector is further divided depending on the focus servo control system. On the other hand, summation signal from the light detector 24 is amplified by the amplifier 27 to obtain the change in the reflected light intensity corresponding to the recording mark 7 from the information area 3 and corresponding to the address pit 4 from the address area 2, thereby providing the reproduced signal S27 as the output.

In the information area 3, output V2 corresponding to the reflected light under non-recorded condition wherein there are two grooves on both sides, and output V1 corresponding to the recording mark 7 are obtained. By demodulating this level change, the information signal recorded in the information area 3 can be reproduced. On the other hand, binary signal S28 is obtained from the address area 2 by comparing the level of the reproduced signal S27 and the reference level Vs1 in the comparator 28. The reference level Vs1 is set to an intermediate level between the voltage V2 in the case where there are grooves on both sides and the voltage V3 in the case where there is a groove on one side. Because the binary signal S28 includes the information of the address pits 4 of the grooves G2 and G3 on both sides of the track T2, address information is demodulated by the demodulator 29 for each zone X and Y, and two demodulated signals are compared or added in the system controller 30, thus the address of the track T2 can be identified. When summation is employed, for example, when the groove G2 has a value of "10", groove G3 has a value "11" and the groove G4 has a value "12", such address information can be obtained as "21" for the track T2 and "23" for the track T3. By using the address information thus obtained, information can be recorded by irradiating light which amplitude-modulated by a semiconductor laser 21 in the specified track, and the recorded information can be reproduced.

Although a phase changing material is used for the recording medium in the above description, the invention can be applied to any recording media which has an optically detectable recording state, and the invention is not restricted by the composition of the material of the recording medium. Also the track configuration has not been described in detail above, particularly with respect to the track depth and the gradient of the sloping area between the land and the groove, although these factors do not restrict the applicability of the invention. However, it is possible to give consideration to the quality of signals to be recorded, particularly to the amplitude of the signal and the cross talk, thereby choosing the optimum values for these parameters.

Although the address signal is detected by comparing the reproduced signal with a specified reference level, it may also be detected by means of a differentiating circuit. Further, although signals are demodulated mostly by means of analog circuits, it is also possible to convert the output of the light detector into digital signals by means of an A/D converter, and performing the functions described in this embodiment through arithmetic operations, thereby obtaining the desired address signal and the information signals.

EMBODIMENT 2

Figure 18B:
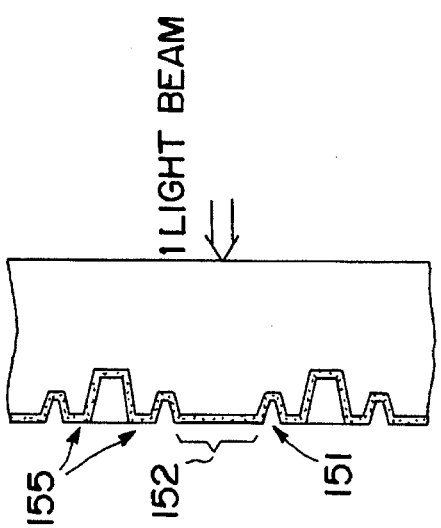
FIGS. 18(a)-(c) show the constitution of a vicinity of an address area and a waveform of a reproduced signal in the conventional recording medium for the land recording.
Figure 18A:
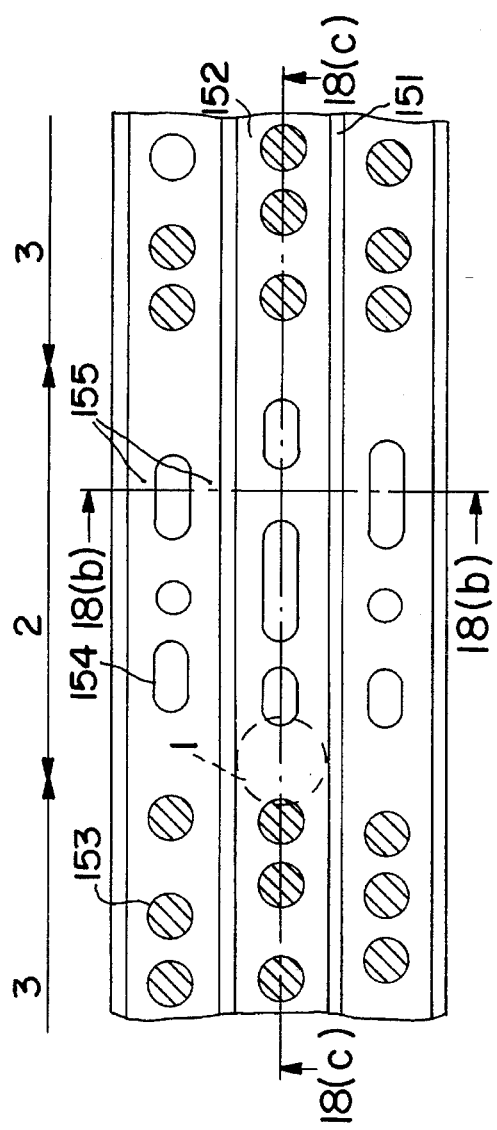
Figure 18C:
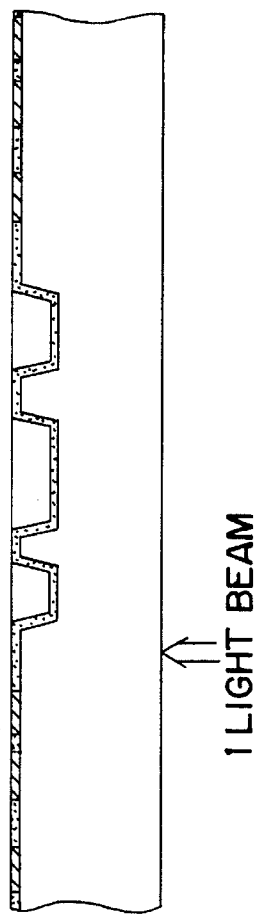
Figure 20:
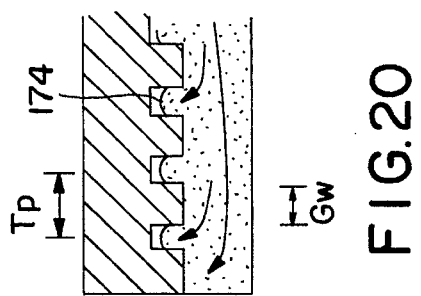
FIG. 20 shows a cross sectional view of an injection molding machine.
Figure 19C:
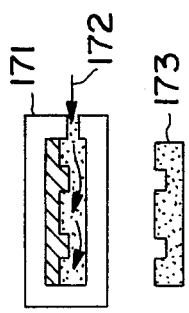
FIGS. 19(a)-(c) show a flow chart illustrative of a conventional process of manufacturing a grooved substrate.
Figure 19B:
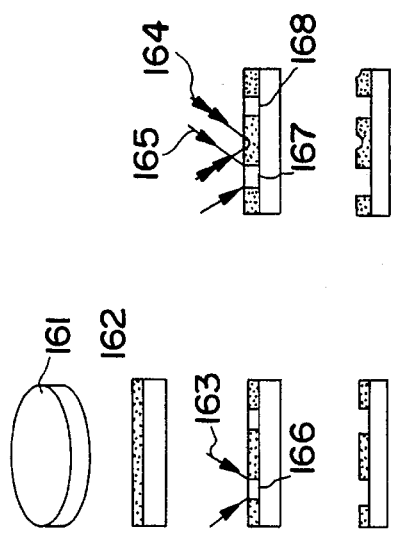
Figure 19A:
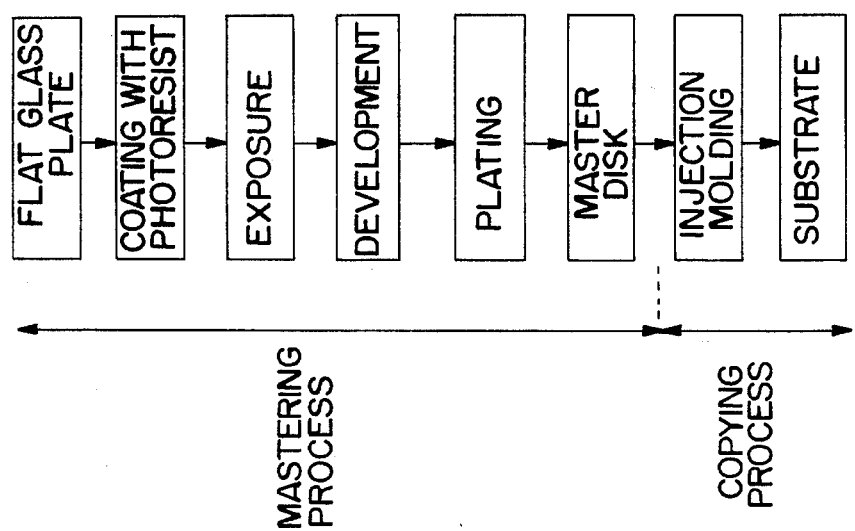

In the first embodiment, the track comprising the lands is accompanied by the address pits on one side, and the address area has a smaller signal amplitude compared to the conventional groove recording shown in FIGS. 18(a)–(c). In this embodiment, a method of forming address pits of the same pattern in the grooves on both sides of the land in order to keep a large amplitude for the address signals will be described below. Conditions other than the address pattern are basically the same as those of the first embodiment.

Figure 4A:
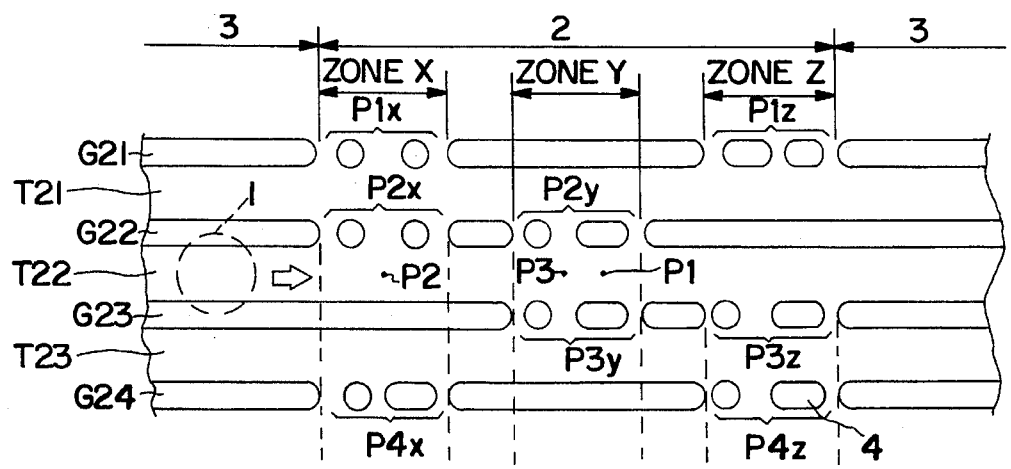
FIGS. 4(a)–(b) show the constitution of a vicinity of an address area of an optical information recording medium and a waveform of a reproduced signal in the second embodiment.
Figure 4B:
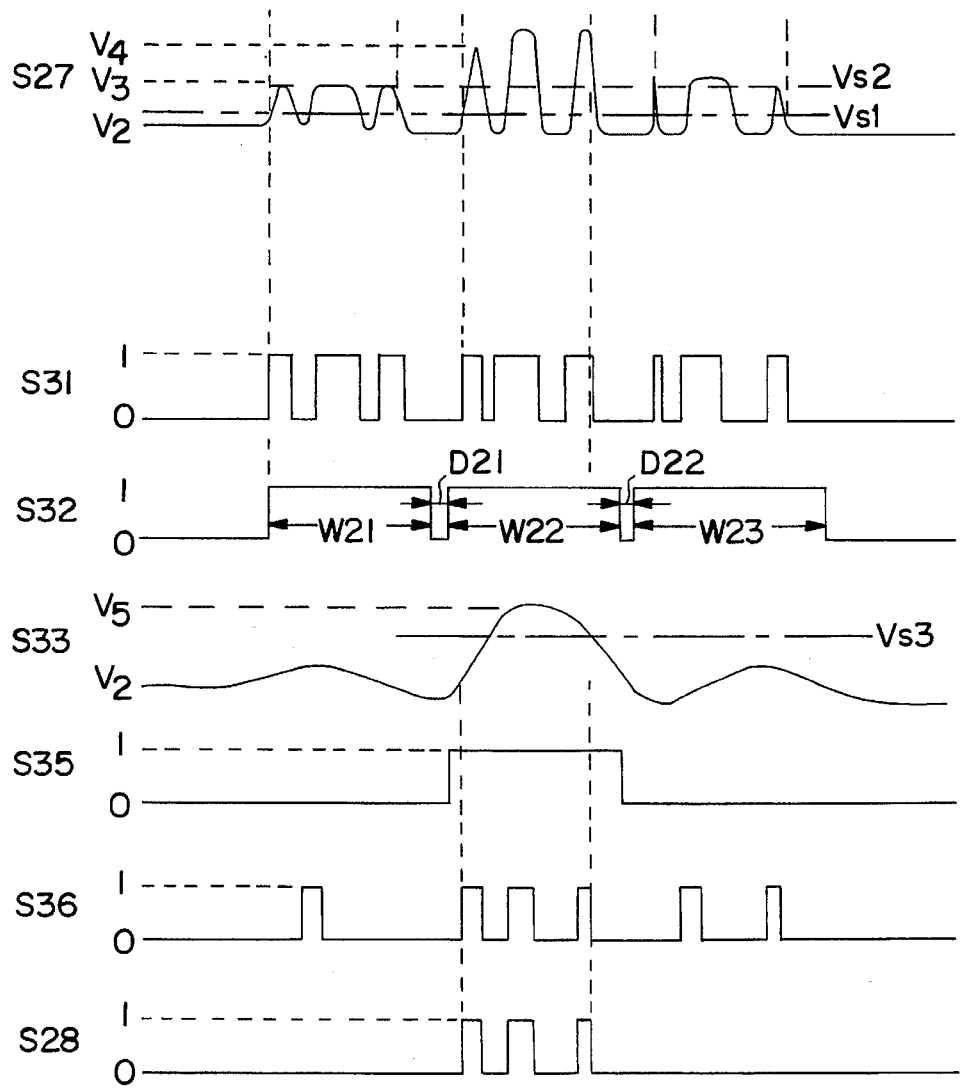

FIG. 4(a) shows an enlarged plan view of a vicinity of an address area of the optical information recording medium of the invention, FIG. 4(b) shows a signal waveform S27 of the reproduced output obtained when a light beam passes a track T22 and a signal waveform obtained after digitization. The recording medium includes an address area 2 and an information area 3 for groove recording. The recording marks 7 on the information area 3 described in the first embodiment will be omitted here for simplification of the description.

The address area 2 has a zone X, a zone Y and a zone Z which are closely located on the groove. Address pits 4 are formed by interrupting the grooves in a pattern according to the specified code signal at two positions among the zone X, the zone Y and the zone Z. The groove G21 has address patterns P1x and P1z. The next groove G22 has an address pattern P2x of the same pattern in an area adjacent to the pattern P1x and an address pattern P2y in an area which does not adjoin the pattern P1x and P1z. Similarly for the groove G23 and other grooves that follow, the same address patterns as the adjoining tracks are arranged successively as shown in the drawing.

The operation for reading out an address signal on the recording medium will be described with reference to FIGS. 4(a)–(b) and the circuit diagram shown in FIG. 5.

The reproduced signal S27 obtained when a light spot 1 passes a track T22 of the recording medium shows a voltage V2 which is output from a point P1 where there are grooves G22, G23 on both sides and a voltage V3 which is output from a point P2 where there is a groove G23 on one side. At a point P3 where grooves do not exist on both sides, diffraction by the grooves disappears and the incident light is reflected according to the reflection factor of the substrate surface so that the light intensity increases and output voltage V4 is obtained. Thus, the address information is detected by using the reproduced signal from the area interposed by the pattern P2y and P3y having the same pattern. Signal amplitude comparable to that of the conventional address pits can be obtained from these address areas of this embodiment.

Demodulation of the address signals is carried out by selecting the signal of an area where address pits of the same pattern exist on both sides and digitizing the signals. The circuit constitution is such that the comparator 28 in the first embodiment is replaced with the constitution of FIG. 5. The circuit includes comparators 31, 36 and a low pass filter (LPF) 33 into all of which are input the reproduced signal S27, a gate generating circuit 32 into which is input an output signal S31 from the comparator 31, a comparator 34 into which is input an output from the LPF 33, a selection circuit 35 into which is input outputs from the gate generating circuit 32 and the comparator 34, an AND circuit 37 into which is input outputs from the selection circuit 35 and the comparator 36.

The operation for reproducing the address signal will be described below.

A binary signal S31 is obtained by comparing the reproduced signal S27 and a reference level Vs1 through the comparator 31. The reference level Vs1 is set to an intermediate level between the levels of the voltages V2 and V3 of the reproduced signal S27. Preferably, in considering the level fluctuation of the reproduced signal S27 and the like, the reference level Vs1 is set to a middle level of the two levels as this embodiment. The gate generating circuit 32 generates a gate signal S32 having widths of time periods W21, W22 and W23 respectively corresponding to the zones X, Y and Z with intervals D21 and D22 therebetween. The gate signal S32 is generated at the same time as the rise of the binary signal S31.

On the other hand, a signal S33 shown in FIG. 4(b) is obtained by passing the reproduced signal S27 through the LPF 33. The comparator 34 has a reference level Vs3 and specifies the zone where the address pits 4 exist at output "1" using the reference level Vs3. The operation is achieved because the intensity of the reflected light from the zone having address pits 4 is larger than that from the zone having no address pits 4. The reference level Vs3 is set to an intermediate level between the highest level of the signal S33 from the zone having the address pits 4 on both sides and the highest level of the signal S33 from the zone having the address pits on one side. Preferably, in considering the level fluctuation of the signal S33 and the like, the reference level Vs3 is set to a middle level of the two levels as this embodiment.

The selection circuit 35 selects a zone among the three zones X, Y and Z corresponding to the time when the output of the comparator 34 is "1", thereby obtaining a selected gate signal S35.

Furthermore, a signal S36 shown in FIG. 4(b) is obtained by passing the reproduced signal S27 through the comparator 36 having a reference level Vs2. The reference level Vs2 is set to ½ of the level of the output voltage V4 from the zone having the address pits 4 on both sides. The AND circuit 37 outputs a binary signal S28 from the selected gate signal S35 and the signal S36. In such a manner, the address signal can be reproduced from the zone having the address pits 4 on both sides.

As described above, the reference level Vs2 of the comparator 36 for obtaining a digitized address signal is set to higher level than the reference level Vs1 of the first embodiment. Therefore, high reliability can be attained with respect to the level fluctuation of the reproduced signal and the reference levels and the like.

EMBODIMENT 3

While an address signal of a large amplitude is obtained by separating the address area 2 into three zones X, Y and Z in the second embodiment, a method of identifying the address of the land by means of only two zones will be described here. FIG. 6(a) shows a plan view of a vicinity of an address area, and FIG. 6(b) shows a reproduced signal obtained when a light beam 1 passes a track T32 and a digitized signal. The address area 2 comprises two zones X and Y which are closely located. Grooves G31 through G34 are arranged in such a manner so that the zone changes alternately in every track so that the address pits 4 of either of the zones X and Y has the same pattern as that of the adjoining groove. Configuration of the grooves is the same as that of the first embodiment.

Because the reproduced signal S27 obtained by reproduction of the track T32 of the recording medium has the same pattern of the address pattern on both sides similar to the second embodiment, significant change in the signal amplitude is found in the zone Y. The change in the signal amplitude from the zone X is not so large as that from the zone Y because the address patterns of the both sides are different from each other. Using the difference, the zone Y having an address signal corresponding to the track T32 can be identified.

In the zone X, however, a large amplitude change is found in an area where surfaces of different grooves overlap. Consequently an erroneous pulse 31 is generated in the digitized signal S28. However, these erroneous pulses 31 are judged as an error address area in the error correction step of the information demodulating process, and can be neglected. For example, in the case where the address pits 4 have a plurality of parities for correcting an error as well as the address signal, the amount of error of the parities is compared with respect to each of the zones X and Y to select the zone having the smaller amount of error, thereby identifying the target zone of the address area 2.

Thus it is made possible to obtain a comparably high address reproduction signal and to reduce the width of the address area 2 in this embodiment compared to the second embodiment, thereby enabling it to increase the information area 3 of the recording medium, namely the recording capacity.

EMBODIMENT 4

Figure 7A:
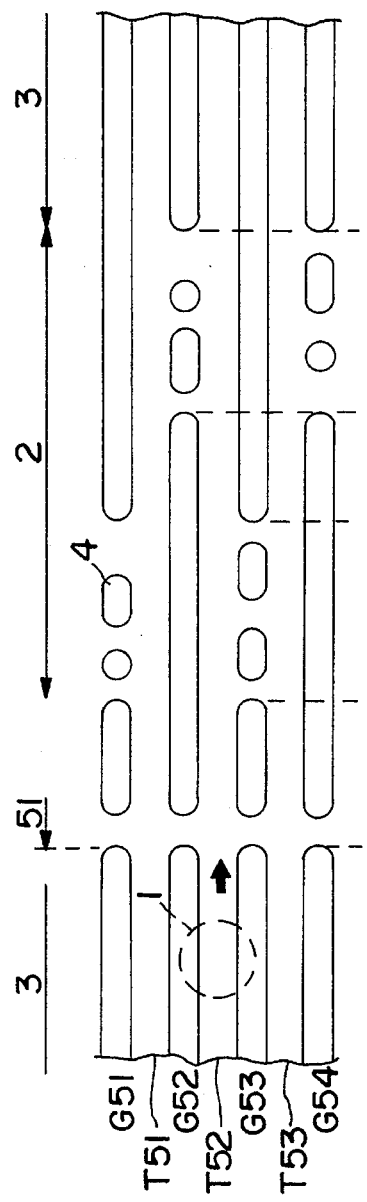
FIGS. 7(a)–(b) show the constitution of a vicinity of an address area of an optical information recording medium and a waveform of a reproduced signal in the fourth embodiment.
Figure 7B:
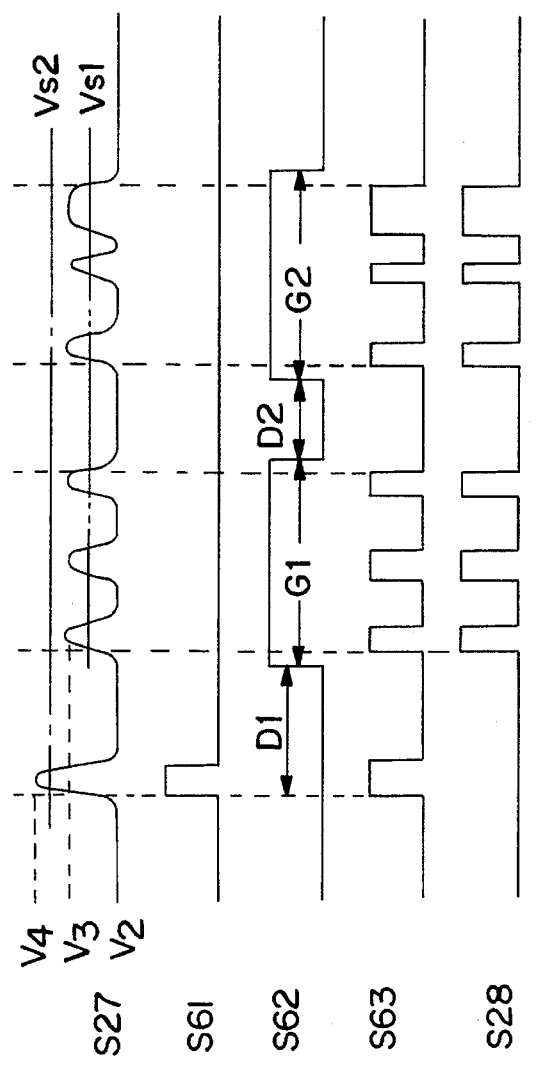

Described here is a recording medium wherein an area to indicate a start of an address area is provided prior to the address area in order to increase the certainty of demodulation of the address signals divided into a plurality of zones, and a reproduction method therefor. FIG. 7(a) shows a plan view of a vicinity of the address area of the recording medium, and FIG. 7(b) shows the reproduced signal and digitized signal. Provided in front of the address area 2 is an address start zone 51 by interrupting the grooves G51 through G54. The same pattern as that of the adjoining groove is always formed in the address start zone 51. The pattern of the address pits 4 that follow may be any of the embodiments 1 through 3. The pattern of the first embodiment will be adopted here.

Figure 8:
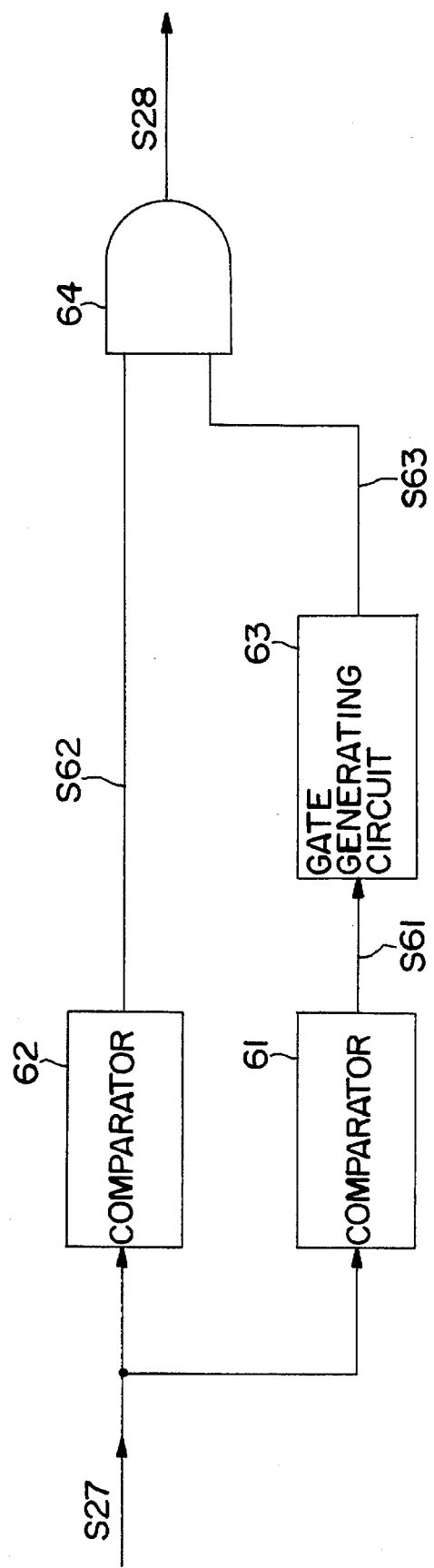
FIG. 8 shows a block circuit diagram illustrative of the constitution of a comparator circuit of the recording/reproducing apparatus of the fourth embodiment.

Reproduction of signals from the recording medium will be described below using the circuit diagram shown in FIG. 8 and the signal waveform shown in FIG. 7(b). Address demodulation is made possible simply by modifying the function of the comparator 28 shown in FIG. 3 of the first embodiment, and only the content of the circuit to be changed will be shown in FIG. 8. The circuit includes two comparators 61 and 62 into which is input the reproduced signal S27 from the amplifier 27, a gate generating circuit 63 into which is input an output signal S61 from the comparator 61, and an AND circuit 64 into which is input output signals S62 and S63 respectively from the comparator 62 and the gate generating circuit 63.

As shown in FIG. 7(b), the reproduced signal S27 obtained when the light beam 1 passes a track T52 shows a large optical output V4 because both sides are flat planes in the address start zone 51. The address area 2 that follows includes a part where there is a flat plane on one side. The reproduced signal 27 shows the amplitude change of the optical output V3. A reference voltage level of the comparator 61 is set to an intermediate level Vs2 between the optical output V3 and optical output V4. As a result, the comparator 61 outputs a digitized signal S61 only from the part corresponding to the address start zone 51. Corresponding to the rising edge of the signal S61, the gate generating circuit 63 generates gate signals G1 and G2 of a specified width at such a timing as delayed by a constant delay time period D1 from the signal S61. The delay time period D1, gate signals G1 and G2, and the gate interval D2 can be set in the gate generating circuit 63 according to the zone setting conditions of the address area 2 used in the mastering process of the recording medium.

A reference voltage level Vs1 of the comparator 62 is set to an intermediate level between the levels V2 and V3 similarly to the case of the first embodiment, thereby obtaining the digitized signal S62. Then, a signal S28 is obtained as the logical product of signals S61 and S62 in the AND circuit 64. The signal S28 has a similar pattern as the digitized (binary) signal S26 of the first embodiment, and the address signal can be demodulated in the same circuit in the following processes.

The constitution described above makes it possible to detect the position reliably from the address start zone 51, because reproduction is carried out always at the same position and at the same timing with respect to the rotation of the recording medium and the pattern of the adjoining track is the same. As a result, address signals generated from different zones of a plurality of places can be demodulated with high certainty as in this invention. It is obvious that a similar effect can be obtained for the patterns of embodiments 2 and 3, although a detailed description will not be given here.

EMBODIMENT 5

Figure 9A:
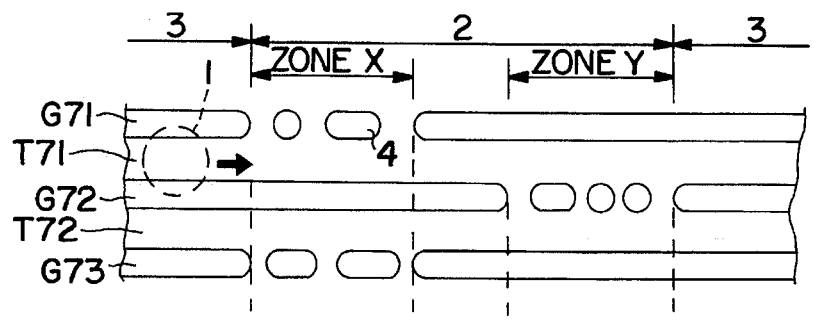
FIGS. 9(a)–(f) show the constitution of a vicinity of an address area of an optical information recording medium and a waveform of a reproduced signal in the fifth embodiment.
Figure 9B:
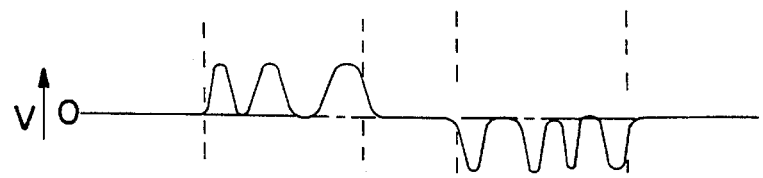
Figure 9C:
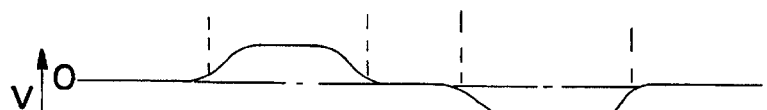

In the address pattern shown in embodiments 1, 2 and 4, there are zones having continuous track on one side of the track as shown in FIG. 9(a). Consequently, difference output S25 from the differential amplifier 25 used in the tracking control shown in FIG. 3 shows a level change depending upon which side the address pits 4 exist with respect to the tracking direction in the address area 2 as shown in FIGS. 9(b) and 9(c). Although, in the case of high revolution speed of the optical disk, malfunction is not likely to occur because there is a frequency band which allows follow-up of the control system. In the case of low revolution speed, however, signal change in the address area 2 nears the control frequency band resulting in such a control signal as shown in FIG. 9(c), thereby causing malfunction in the tracking control.

Figure 9D:
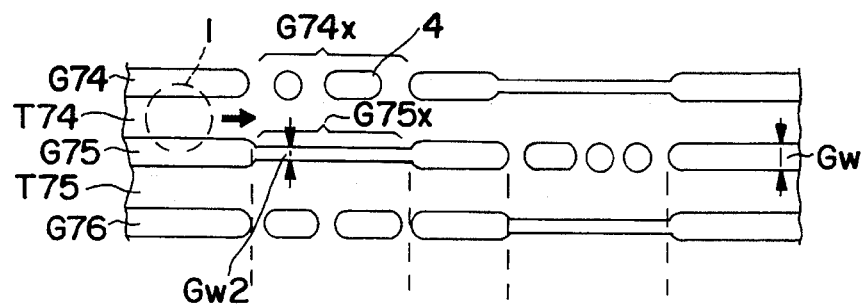
Figure 9E:
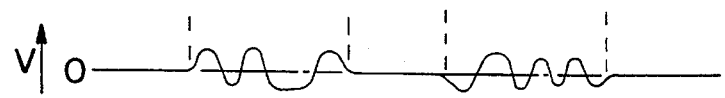
Figure 9F:

In order to solve this problem, track width Gw2 of the groove G75 of a zone G75x adjoining a zone G74x where the address pits 4 exist is made smaller than the track width Gw of the information area 3, as shown in FIG. 9(d) in this embodiment. That is, when there is a continuous track on one side and a zone having the address signal on another side, the effects of diffraction caused by the grooves G74 and G75 on both sides can be equalized with respect to the light beam. When the light beam 1 passes over the track T74 having such an address area 2, the difference signal S25 shows a slight change around 0 V as shown in FIG. 9(e). Because this signal S25 has a change which cannot be followed in the bandwidth of the tracking servo, a control signal having less fluctuation can be obtained as shown in FIG. 9(f). As a result, stable tracking servo operation can be obtained.

The reproduced signal obtained from the address area 2 obtained in this case has a signal level smaller than those of embodiments 1 and 2. This can be accommodated by relatively decreasing the reference level.

Figure 10A:
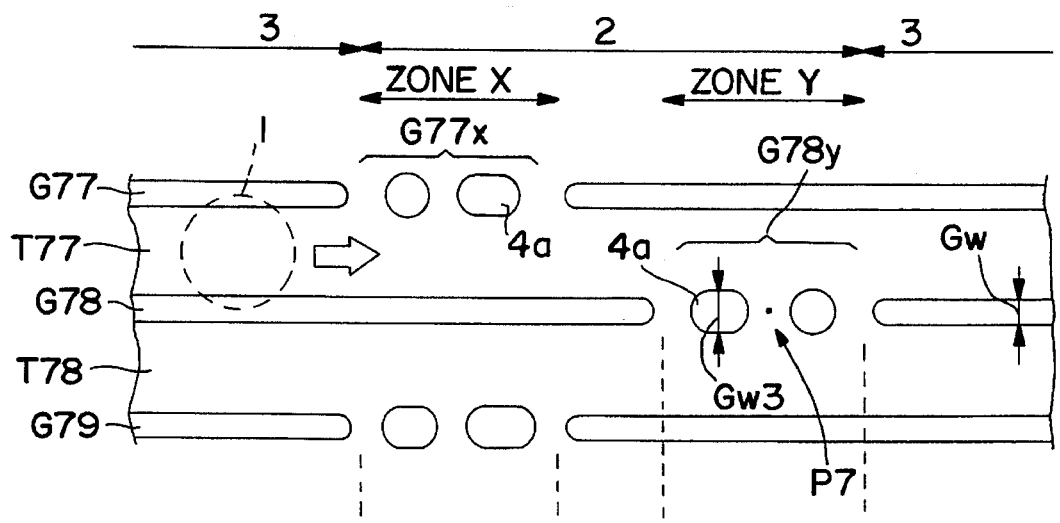
FIGS. 10(a)–(c) show the constitution of a vicinity of an address area of an optical information recording medium and a waveform of a reproduced signal in the fifth embodiment.
Figure 10B:
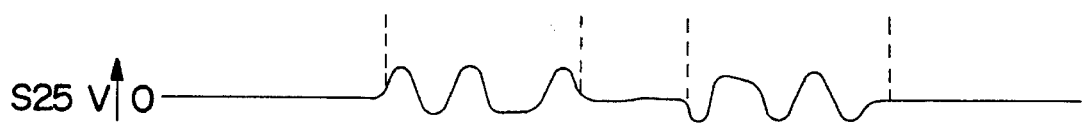
Figure 10C:
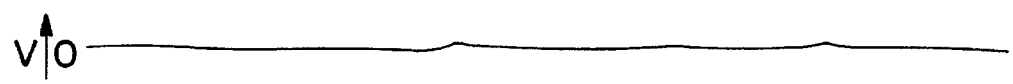

In another method for obtaining a stable servo operation, address pits 4a having a pattern shown in FIGS. 10(a)–(c) are used. In this method, the width Gw3 of the address pit 4a is set to be larger than the width Gw of the groove G78, thereby decreasing the intensity of the reflected light by the increased amount at a point P7 between the address pits 4a. That is, in the area where the address pits 4a having a larger width exist, the intensity of the reflected light is decreased due to diffraction of the light beam 1 and the decrease counteracts the above-mentioned increased amount.

The method for forming address pits having a pattern of the first embodiment is described above. The present embodiment can be applied to the method of the second embodiment in which address pits are formed with the same pattern in the tracks adjoining each other. In such a case, both the method making the width of the continuous track smaller than that of the address pit and the method making the width of the address pit larger than that of the groove can be applied to the zone having a continuous track on one side.

EMBODIMENT 6

Figure 11A:
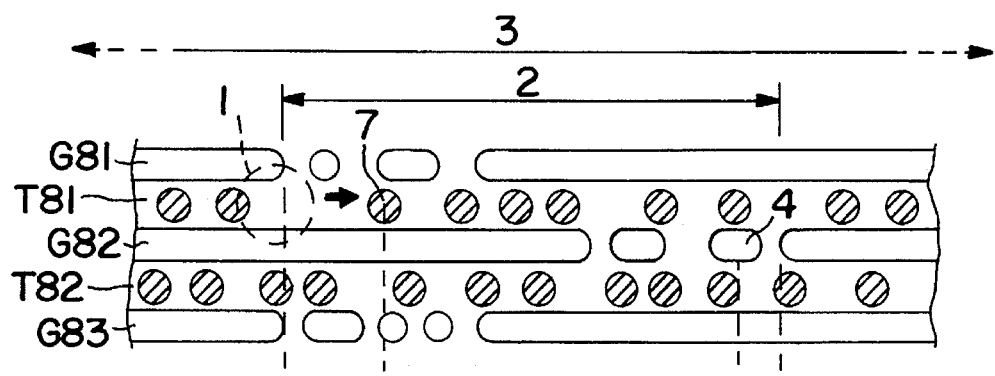
FIGS. 11(a)–(b) show the constitution of a vicinity of an address area of an optical information recording medium and a waveform of a reproduced signal in the sixth embodiment.

Although the embodiments described so far and most of the conventional optical disks are based on a method of recording the address area and the information area separately in the circumferential direction, a method capable of recording and reproducing the address area and the information area being overlapped will be described below. FIG. 11(a) shows the constitution of the optical disk, FIG. 11(b) shows the reproduced signal waveform.

An address pattern of the optical disk substrate is the same as that of the first embodiment as shown in FIG. 11(a), and the only difference is that the information area 3 to record the information signals overlaps with the address area 2 and the recording marks 7 are formed continuously on the lands. The process of irradiating the light beam 1 on the track T81 and demodulating the reproduced signal thus obtained will be described below with reference to a signal demodulation system shown in FIG. 12 and a signal waveform shown in FIG. 11(b). For the input signal shown in FIG. 12, amplifier output S27 of the summation signal from the light detector 24 which is divided in a direction perpendicular to the track shown in FIG. 3 and the differential amplifier output S25 are used.

Figure 11B:
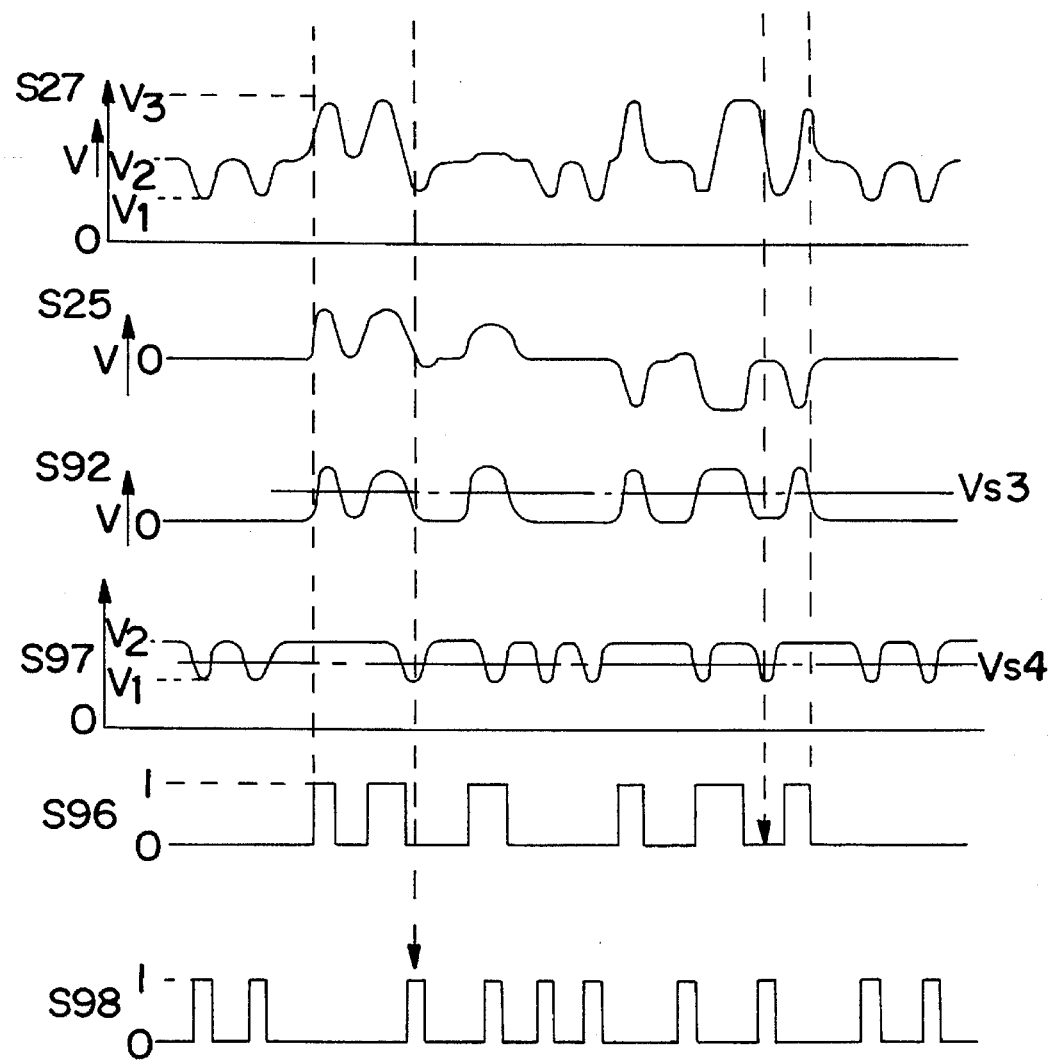

As shown in FIG. 11(b), amplified signal S27 of the summation signal shows a waveform wherein the change in the reflection factor due to the recording mark 7 and the diffraction effects due to the address pit pattern are synthesized. On the other hand, the differential amplifier output S25 shows a change according to the presence or absence of the address pit 4 adjoining the track, and the polarity thereof is inverted depending on which side of the track T81 the address pit 4 is formed.

Figure 12:
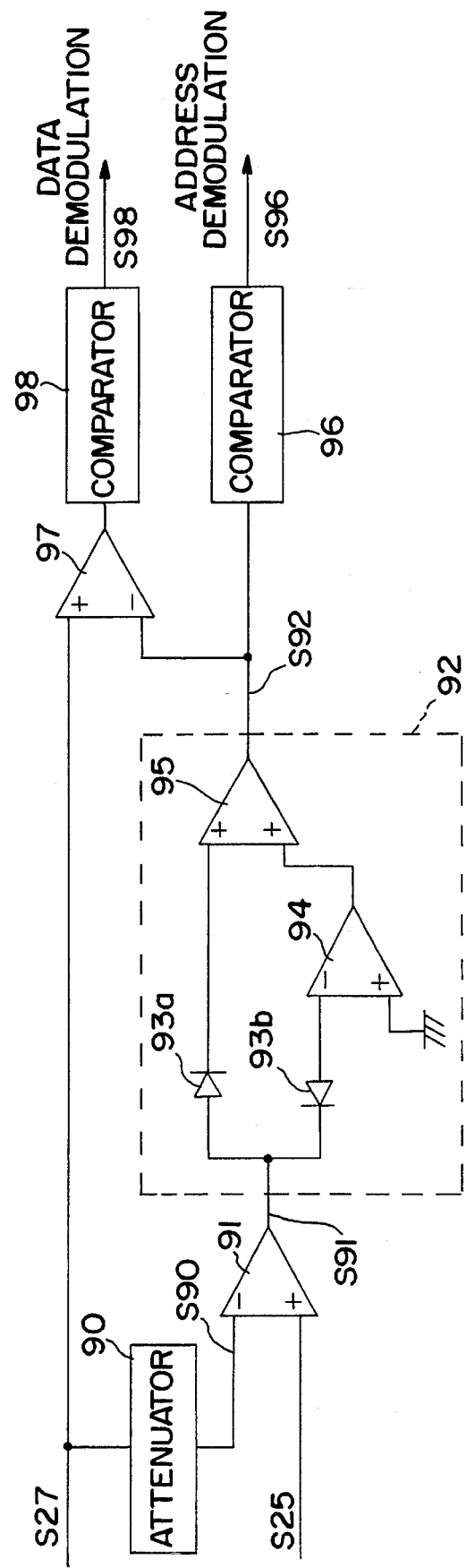
FIG. 12 shows a block circuit diagram illustrative of an address detecting circuit and a data detecting circuit of the recording/reproducing apparatus of the sixth embodiment.

FIG. 12 shows a block circuit diagram of a demodulation circuit for the address signal and the information signal. The demodulation circuit includes a attenuator 90 into which is input the amplified signal S27, a differential amplifier 91 into which is input an output from the attenuator 90 and the differential amplifier output S25, an absolute value circuit 92 into which is input an output from the differential amplifier 91, a comparator 96 into which is input an output from the absolute value circuit 92, a differential amplifier 97 into which is input the amplified signal S27 and an output from the absolute value circuit 92, and a comparator 98 into which is input an output from the differential amplifier 97. The operation of the demodulation circuit having a structure mentioned above will be described below.

The differential amplifier output S25 is affected by the distortion of the waveform due to the recording mark 7. In order to reduce this influence, a differential signal S91 is obtained through the differential amplifier 91 using the differential signal S25 and a signal S90 obtained by attenuating the amplified signal S27 through the attenuator 90 having a constant attenuation ratio in accordance with the change in the intensity of the reflected light. A signal S92 is obtained by converting the signal S91 to have only the positive amplitude change in an absolute value circuit 92. Specifically, in the absolute value circuit 92, the signal S92 is obtained by restricting the amplitude to changes in only one direction by means of two diodes 93a and 93b, inverting the negative amplitude by a differential amplifier 94 and amplifying the sum of the signal from the diode 93a and the signal S94 from the differential amplifier 94 in an amplifier 95. Digitized signal S96 is obtained by comparing the level of the signal S92 with a specified reference level in the comparator 96 in a method similar to that of the first embodiment. Based on the signal S96, the track can be identified by demodulating the address signal.

On the other hand, the summation signal S27 corresponding to the change in the reflection factor of the recording mark 7 is subject to distortion of the waveform due to the effect of the adjoining address signal. The waveform distortion can be suppressed by subtracting the absolute value circuit output S95 from the summation signal S27 by means of the differential amplifier 97. That is, the amount of light diffraction in the case where there are grooves on both sides is larger than the amount of light diffraction in the case where there is an address pit 4, and the change in the amount of light diffraction can be regarded as being proportional to the difference of the light intensity on the two light detectors. The amplitude change caused by the address pit 4 in the output signal S97 thus obtained is suppressed, showing a reproduced amplitude corresponding to the configuration of the recording mark 7. Then a digitized signal S98 which corresponds to the pattern of the recording mark 7 is obtained by comparing S97 in a comparator 98 which has a reference level Vs4 between voltages V1 and V2. In order to remove the effect of the address pit 4 more accurately, the amplitude of the input signal S95 to the differential amplifier 97 can be adjusted finely according to the track configuration.

As described above, the substrate and the reproduction system, of this constitution make it possible to demodulate the address signal and the reproduced signal from the recording mark independently in a recording medium wherein the address area 2 and the information area are overlapped.

EMBODIMENT 7

Although embodiments 1 through 6 employ methods of recording the signals only on lands, methods of recording the information on both the lands and grooves will be described below.

Figure 13B:
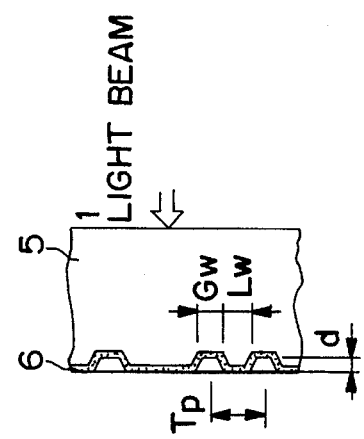
FIGS. 13(a)–(d) show the constitution of a vicinity of an address area of an optical information recording medium and a waveform of a reproduced signal in the seventh embodiment.
Figure 13A:
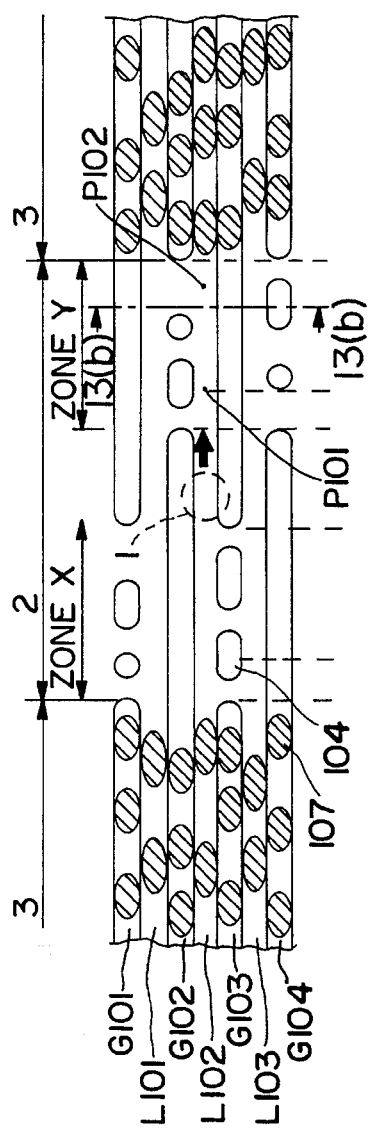
Figure 13C:
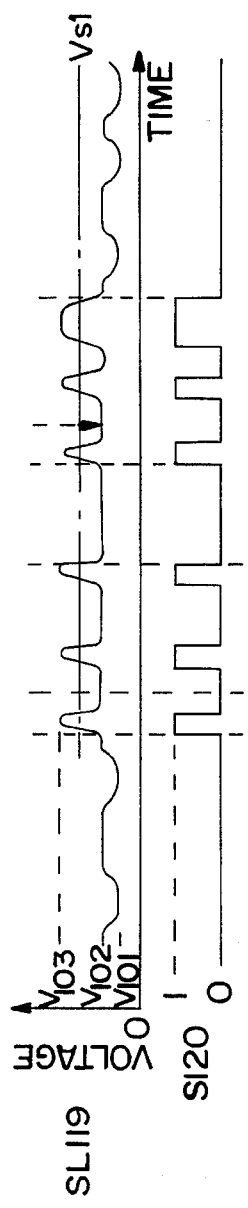
Figure 13D:
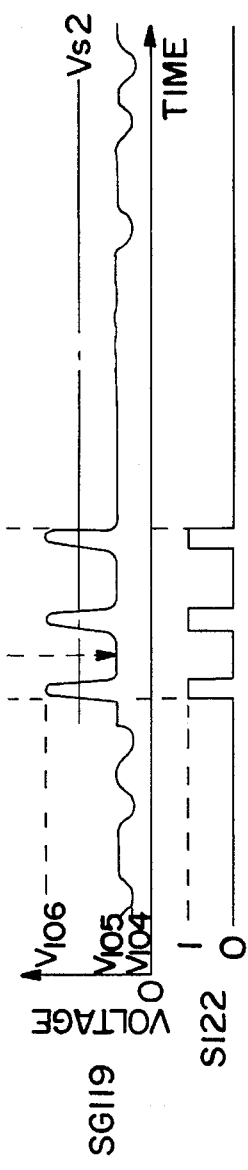

FIG. 13(a) shows an enlarged plan view of a vicinity of an address area of the optical information recording medium of the invention, FIG. 13(b) shows a cross sectional view of the address area taken along a line 13(b)—13(b) of FIG. 13(a), and FIG. 13(c) shows the waveform of a reproduced signal output obtained when the light beam 1 passes a track L102 on the land and the waveform of a digitized signal. For contrast, the reproduced output from a track G103 on the groove and digitized signal are shown in FIG. 13(d). While the configuration of the guide track shown here has the same pattern as that shown in FIG. 1, width Gw of the groove in the direction perpendicular to the track and width Lw of the land are set to substantially equal values. For the grooves G101 and G103, the address pattern is formed in the zone X and, for the grooves G102 and G104 which exist between thereof, the address pattern is formed in the zone Y.

When the light beam 1 passes over the land L102 in the address area 2, the diffraction effect of the tracks on both sides is pronounced at a point P101 where there are grooves G102, and G103 on both sides similarly to the case of the information area 3, resulting in the reproduction output of V102. On a point P102 where a groove does not exist on one side, light intensity increases due to less diffraction of the incident light because one side is a flat plane, and consequently a voltage V103 is obtained. By comparing the signal of the light intensity change with the reference voltage level, address information from the two zones X and Y can be obtained, and demodulation thereof enables it to identify the address of the track whereon the light beam 1 is passing.

When the light beam 1 passes over the groove, on the other hand, change in the reflected light intensity is found corresponding to the address pit 104, similar to the case of a conventional groove recording. That is, reflected light intensity is equivalent to that of the groove section and the voltage is V105 in an area where the address pit 104 exists, while the reflected light intensity increases and voltage V106 is obtained in a flat area where no pit exists. Address information is reproduced by demodulating this signal of light intensity.

By employing the constitution described above, address information can be obtained by detecting the change in the amount of diffraction of the reflected light due to the address pit 104 formed by interrupting the grooves, also in the case of reproducing the address from the land section. Therefore, a substrate capable of land recording can be made in the mastering process employing the single laser beam used in the conventional groove recording.

For the constitution of the guide track, it is desirable that the groove width Gw in the direction perpendicular to the track and the land width Lw are nearly equal to each other. That is, when the light beam is applied to the land section and the groove section, the reflected light intensity changes according to the track width. By equalizing the widths of both sections, it is made possible to keep the reflected light intensity on the light detector constant. Thus, it is made possible to obtain equivalent amplitudes from both signals recorded in the land section and the groove section. The track width is preferably in a range of Gw/Lw from 0.7 to 1.3.

Although the depth of the guide track d has been set to $\lambda/(8n)$ and an odd number times multiple thereof in order to maximize the tracking signal, it is required to set it to minimize the effect of the change in the adjoining recording mark 107 (called cross talk) on the reproduced signal from the recording mark 107 recorded on both the land and the groove, when signals are recorded on both the lands and the grooves. In an experiment using a substrate with changing track depth, a tendency of increasing recorded signal and decreasing cross talk were observed in the vicinity of $\lambda/(5n)$ between $\lambda/(8n)$ and $\lambda/(4n)$. Thus, it is necessary to make the track widths of the land and the groove equal and to select an optimum depth when recording signals on both the lands and the grooves. This is in comparison to the case of recording in the track of one side, and optimum values can be obtained experimentally according to the signal quality.

The substrate of the constitution shown here is made by means of an injection molding machine from a master disk made in the mastering process employing a light exposure apparatus provided with a single Ar laser light source shown in the description of the related art. The surface can be coated with a thin film which can accommodate recording methods wherein the optical characteristics of the thin film change upon exposure to light described in the related art, for example, deformation recording, phase change recording, magnetooptical recording and photon mode recording. FIGS. 13(a)–(d) show an example of providing a phase changing thin film capable of reproducing the signals by the change in the reflection factor as the recording layer. The recording mark 107 obtained by laser irradiation shows a decrease in the reflection factor compared to the initial condition.

Figure 14:
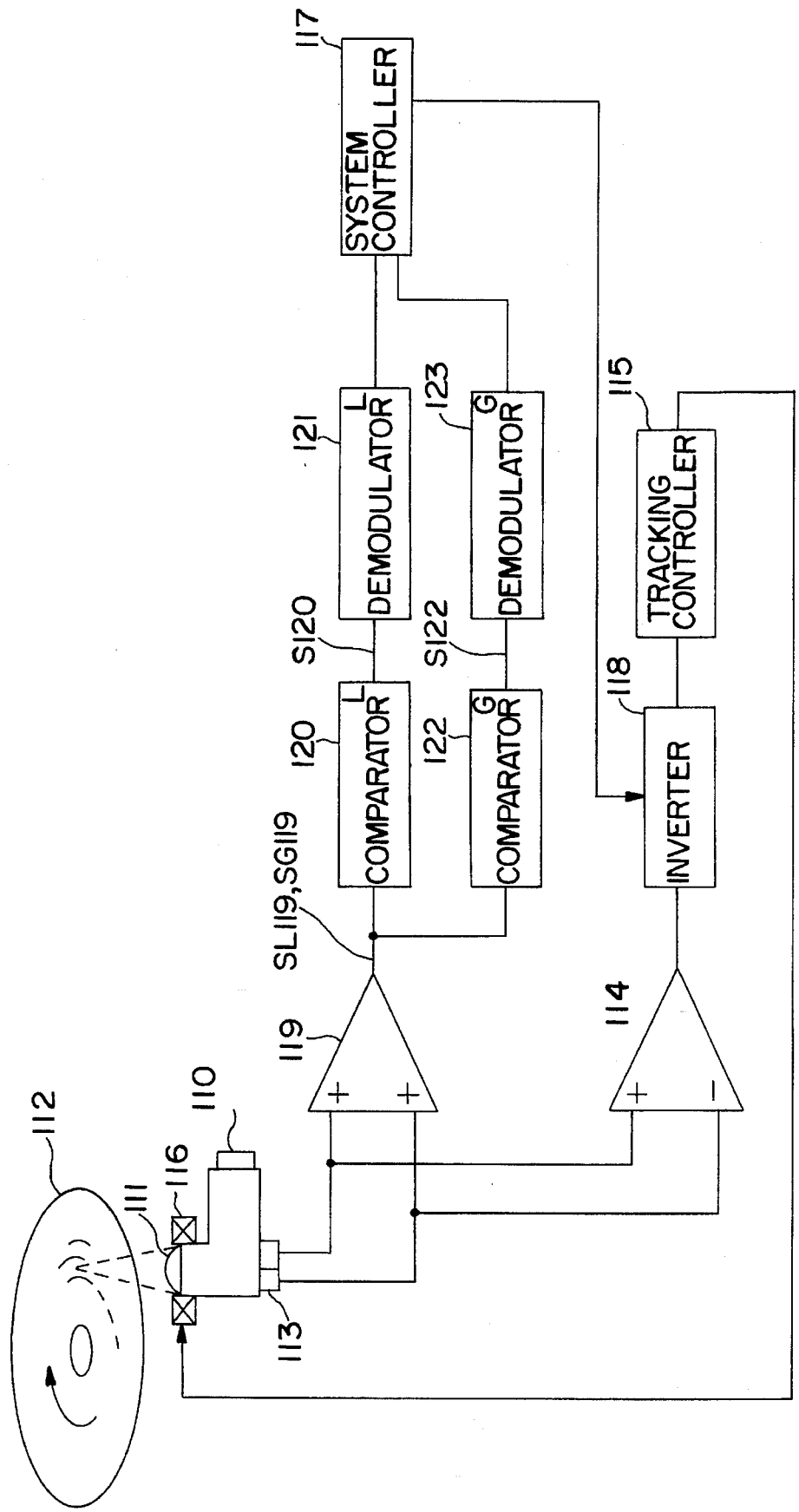
FIG. 14 shows a block circuit diagram illustrative of the constitution of a recording/reproducing apparatus of the seventh embodiment.

FIG. 14 shows the constitution of the signal recording/reproducing apparatus according to the invention. The constitution of the apparatus and the operation thereof will be described below.

The signal recording/reproducing apparatus includes an optical system comprising a laser light source 110, an objective lens 111 to focus the light onto a recording medium 112 and a light detector 113 to detect the reflected light from the recording medium 112, a voice coil 116 supporting the objective lens 111, a differential amplifier 114 into which is input an output from the light detector 113, an inverter 118 into which is input an output from the differential amplifier 114, a tracking controller 115 into which is input an output from the inverter 118, and a system controller 117.

By means of the optical system, a laser light beam from the laser light source 110 is irradiated onto the rotating recording medium 112 through the objective lens 111, and the light detector 113 having a plurality of light reception faces to receive the reflected light, carries out focusing control and tracking control. Tracking control is carried out by using a signal from the light reception face of the light detector 113 which is divided in the direction perpendicular to the track, by amplifying the difference of the outputs by the differential amplifier 114 and driving the voice coil 116 which directs the objective lens 111 by means of a tracking controller 115, thereby making it possible to track the light beam along the guide track on the recording medium 112. Whether tracking control is made on the lands or the grooves of the guide track of the recording medium 112 is determined by driving the inverter 118 which inverts the polarity of the output from the differential amplifier 114 according to the setting of the system controller 117.

The signal recording/reproducing apparatus further includes an amplifier 119 into which is input the output of the light detector 113, two comparators L120 and G122 into which is input an output from the amplifier 119, and two demodulators L121 and G123 respectively into which is input outputs from the comparators L120 and G122.

By amplifying the summation signal of the outputs from the light detector 114 by the amplifier 119, change in the reflected light intensity can be obtained corresponding to the recording marks 107 from the information area 3 and to the address pits 104 from the address area 2, as shown in FIG. 13(c) for the case of land and in FIG. 13(d) for the case of groove.

When the light beam 1 scans over the land L2, signal SL119 can be obtained from the amplifier 119 corresponding to the change in the reflected light intensity as shown in FIG. 13(c). In the information area 3, output voltage V102 corresponding to the reflection factor in the case where there are grooves on both sides and output voltage V101 corresponding to the recording mark 107 are given. The signal level of the reproduced signal SL119 from the address area 2 is compared with the reference level Vs101 by the comparator L120. The reference level Vs101 is set to an intermediate level between the voltage V102 in the case where there are grooves on both sides and the voltage V103 in the case of a groove on one side. Because digitized signal S120 includes the address pit information of the grooves G102 and G103 on both sides of the track, address information is demodulated by means of the demodulator L121 for each zone, and the two demodulated signals are compared or summed in the system controller 117, thereby the address of the land L102 can be identified. When summation is employed, for example, when the groove G102 has a value of "10", the groove G103 has a value "11" and the groove G104 has a value "12", such address information can be obtained as "21" for the land L102 and "23" for the land L103.

On the other hand, reproduced signal SG119 of the groove G102 shows the change, in the information area 3, of the output voltage V105 corresponding to the reflected light from the groove under non-recorded condition and of the output voltage V104 corresponding to the recording mark 107 as shown in FIG. 13(d). By demodulating this level change, the information signal from the information area 3 can be reproduced. On the other hand, a binary signal S122 is obtained from the address area 2 by comparing the level of the reproduced signal SG119 and the reference level Vs102 in the comparator G122, and the address signal is demodulated in the demodulator G123 based on this signal.

By using the address signal thus obtained to locate the current position of the light beam 1 and move the light beam position by means of a tracking driving means according to the difference from the target track, it is possible to follow the target track. Signals can be recorded or reproduced after being recorded along the track by modulating the intensity of the semiconductor laser light source 111. That is, the signal SL119 from the recording mark 107 formed on the land L102 is compared to an intermediate level between the voltage V101 and the voltage V102 as the reference level in a third comparator, and is demodulated, thereby an information signal can be reproduced. Information on the grooves can also be reproduced in a similar method.

As described above, it is made possible to identify the address from either of the tracks on the land and groove, and information can be recorded or reproduced on or from an arbitrary track.

EMBODIMENT 8

When address pits are provided alternately in different zones on the grooves as in the case of the seventh embodiment, address reproduction amplitude in the case of tracking on the lands becomes smaller than the case of reproducing from the grooves. Described below is a method of forming the address pits of the same pattern on the grooves on both sides of the land, in order to keep a large amplitude of the address signal even during groove reproduction. Conditions other than the address pattern are basically the same as in the seventh embodiment.

FIG. 15(a) shows an enlarged plan view of a vicinity of an address area of the optical information recording medium of the invention, FIG. 15(b) shows the waveform of a reproduced signal output obtained when the light beam 1 passes a land L122 and the waveform of a digitized signal, and FIG. 15(c) shows the waveform of a reproduced signal output obtained when the light beam 1 passes a groove G123 and the waveform of a digitized signal. Recording marks of the information area 3 are omitted for simplification of the description.

The address area 2 has a zone X, a zone Y and a zone Z which are closely located. Address pits 104 are formed in the address area 2 by interrupting the grooves in a pattern according to the specified code signal in any two zones among the three zones X, Y and Z. Address pits 104 exist in the zone X and the zone Z on the groove G121. On the next groove G122, the same pattern as the zone X of the groove G121 is provided in the zone X, a new address pattern is provided in the zone Y, and the zone Z is made to be a continuous track. For groove G123 and the grooves that follow, the same address patterns as the adjoining tracks are arranged successively as shown in the drawing.

Demodulation of the address signal is carried out in a constitution similar to that of the seventh embodiment. Reproduced signal SL119 from the land L122 of the recording medium shows the same output voltage V102 in the information area 3 at a point P101 where there are grooves G122 and G123 on both sides and an output voltage V103 from a point P102 where there is no groove on one side. At a point P103 where grooves do not exist on both sides, diffraction by the grooves disappears and the incident light is reflected according to the reflection factor of the substrate surface so that the light intensity increases and output voltage V107 is obtained. Thus, the address information is detected by using the reproduced signal from the area where the point P103 exists, namely from the zone Y on the land L122. Signal amplitude comparable to that of the groove can be obtained from these address areas 2, if the address pit 104 and the land section have comparable widths.

Demodulation of the address reproduction signal SL119 is carried out by setting the comparator L120 to operate at a reference level Vs103 which is higher than that of the seventh embodiment, thereby a digitized signal S120 can be obtained. In the case of the substrate of this constitution, it is also made possible to digitize the address signals from the lands and the grooves by setting the reference level Vs103 for one comparator instead of the comparators L120 and G122.

Although the reproduced signal SL119 is digitized by using the reference level Vs103, the amplitude of the address pit 104 on one side may exceed this level Vs103 depending on the address pit forming condition and the fluctuation of the reproduction apparatus. In order to eliminate this trouble, a gate selection circuit may be installed immediately following the amplifier 119, to select only such zones as address pits 104 exist on both sides in the same manner as the second embodiment. The selecting circuit is made in such a constitution that identifies a gate generating circuit which generates three gates of time corresponding to the zone width used in advance in the mastering process of the substrate, a phase lock circuit which matches the timing of the gate signals to the amplitudes of the reproduced signals SL119, SG119 and a gate which compares the amplitudes of the reproduced signals in the gates and gives the largest amplitude. An address signal of a high certainty can be obtained from a plurality of address pit signals, by feeding the reproduced signal in the gate thus obtained to the comparators L120, G122.

On the other hand, address reproduction signal of the groove G123 is obtained from the zone Y and the zone Z where address pits 104 exist. The track address can be identified by demodulating these two addresses and calculating the result of demodulation in the system controller 117 similarly to the case of the land in the first embodiment.

EMBODIMENT 9

Figure 16A:
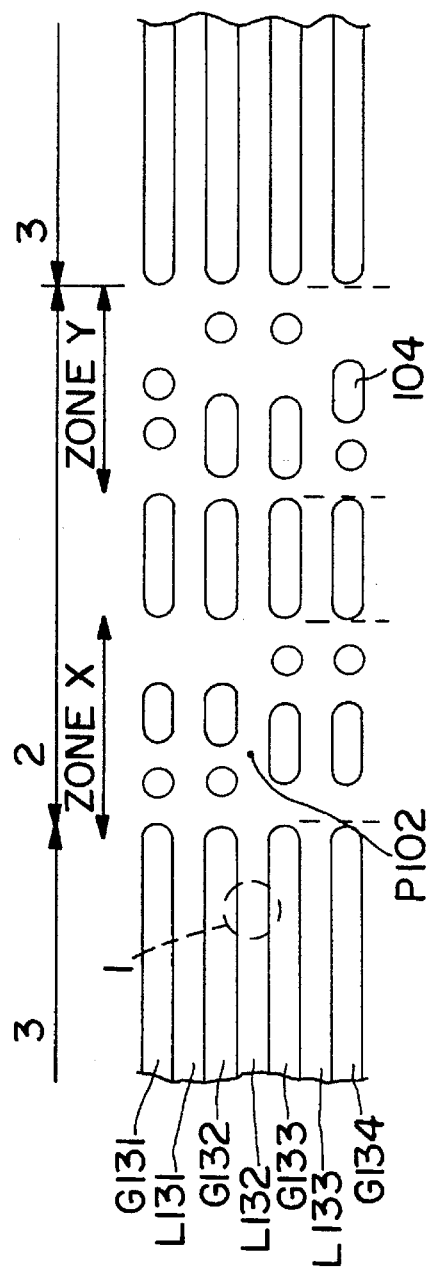
FIGS. 16(a)-(b) show the constitution of a vicinity of an address area of an optical information recording medium and a waveform of a reproduced signal in the ninth embodiment.
Figure 16B:
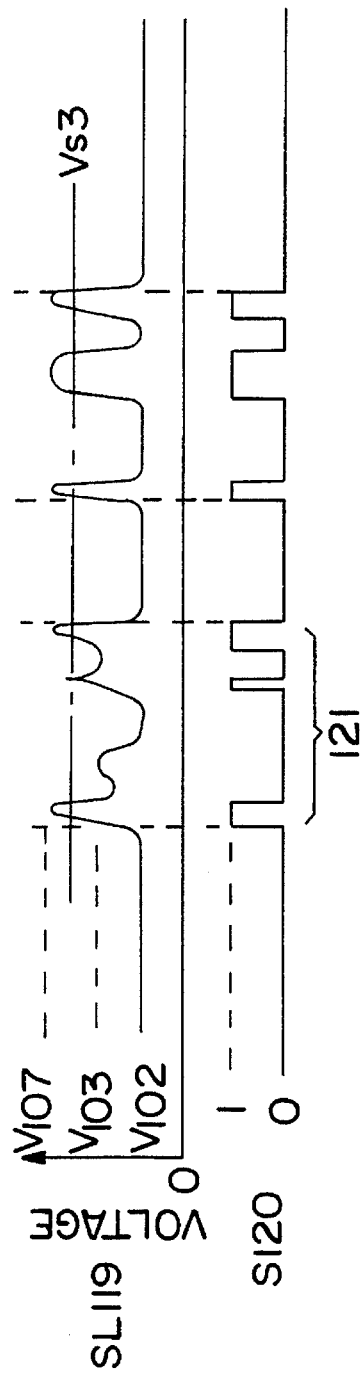
Figure 17B:
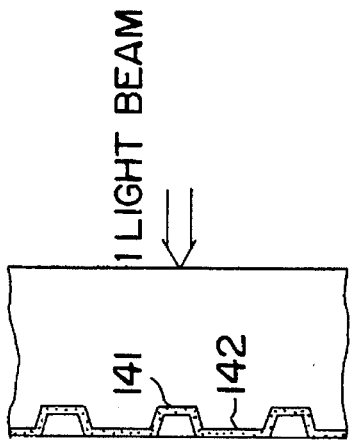
FIGS. 17(a)-(c) show the constitution of a vicinity of an address area and a waveform of a reproduced signal in the conventional recording medium for the groove recording.
Figure 17A:
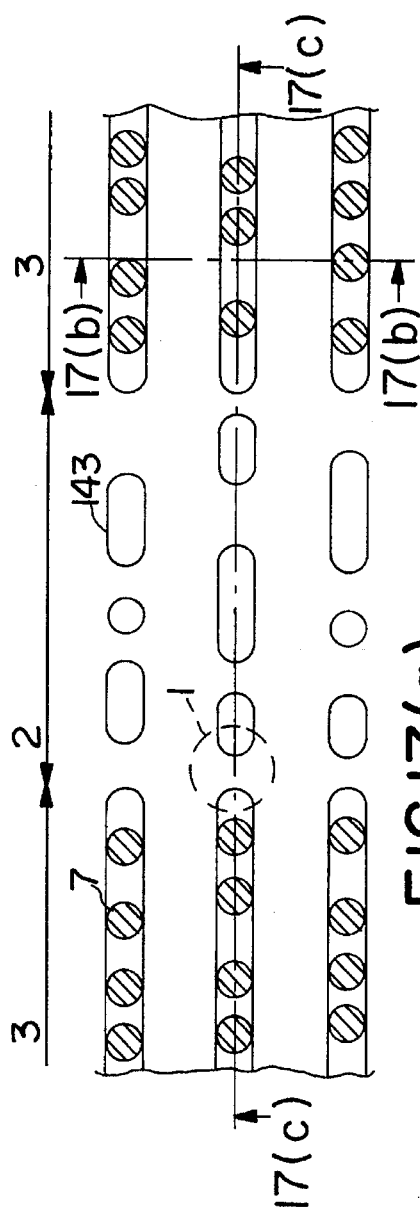
Figure 17C:
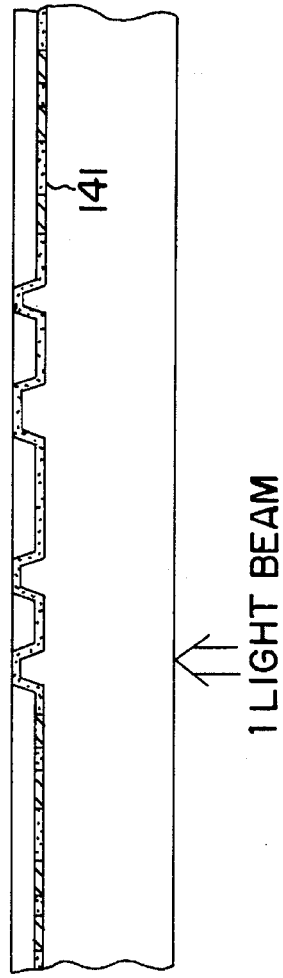

Although an address signal having a large amplitude is obtained from the land section by separating into three zones in the eighth embodiment, a method using two zones will be described below. FIG. 16(a) shows an enlarged plan view of a vicinity of an address area, and FIG. 16(b) shows the reproduced signal obtained when the light beam 1 passes a land L132 and the waveform of a digitized signal. The address area 2 comprises two zones X and Y which are closely located. Grooves are arranged in such a manner as the zone changes alternately in every track so that the address pit 104 of either of the zones has the same pattern as that of the adjoining groove. Configuration of the grooves is the same as that in the seventh embodiment.

Because the reproduced signal SL119 obtained when reproducing the land L132 has the same address pit patterns on both sides similarly to the eighth embodiment, a large change in the amplitude is found in the zone Y. The change in the signal amplitude from the zone X is not so large as that from the zone Y because the address patterns of the both sides are different from each other. Using the difference, the zone Y having the address signal corresponding to the track T132 can be identified.

Also in the zone X, however, a large amplitude change is found in an area where the surfaces of different grooves overlap. As a result, erroneous pulse 121 is generated in the digitized signal S120. However, these erroneous pulses 121 are judged as an error address area in the error correction step of the information demodulating process, and can be neglected.

The address reproduction signal of the groove G132 is obtained for the two zones similarly to the eighth embodiment, and the track address can be identified by demodulating these two addresses and calculating the result of demodulation in the system controller 117 similarly to the case of the land in the seventh embodiment.

As described above, it is made possible to obtain a comparably high address reproduction signal and to reduce the width of address area 2 in this embodiment compared to the eighth embodiment, thereby enabling it to increase the information area 3 of the recording medium, namely the recording capacity.

The method of providing an area indicating the start of the address area prior to the address area described in the fourth embodiment can also be applied to the method of recording the signals both on the lands and the grooves. Further, the method of reducing the width of the continuous track adjoining the address pit or setting the width of the address pit larger than the groove width described in the fifth embodiment can also be applied to the method of recording the signals both on the lands and the grooves.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical information recording medium comprising:
   a substrate including first tracks having a first face and second tracks having a second face, the first face and the second face being optically at different positions in a direction of an incident light beam; and
   a recording layer provided on the substrate on which at least one optically detectable change is caused by irradiating the light beam;
   wherein the first and second tracks have an information recording area and an address area, the address area of the first track having a control information for the information recording area in a direction of the tracks,
   the address area comprises address pits formed exclusively in a part of the first tracks, the address pits being formed in a pattern, and
   the information recording area has a portion on which information is recorded, the portion including at least the second tracks.

2. An optical information recording medium comprising:
   a substrate including first tracks having a first face and second tracks having a second face, the first face and the second face being optically at different positions in a direction of an incident light beam; and
   a recording layer provided on the substrate on which at least one optically detectable change is caused by irradiating the light beam;
   wherein the first and second tracks have an information recording area and an address area, the address area of the first track having a control information for the information recording area in a direction of the tracks,
   the address area comprises address pits formed exclusively in a part of the first tracks, the address pits being formed in a pattern,
   a track pitch of the first tracks is smaller than 1.2 µm, and
   a width of the first tracks is smaller than a width of the second tracks.

3. An optical information recording medium comprising:
   a substrate including first tracks having a first face and second tracks having a second face, the first face and the second face being optically at different positions in a direction of an incident light beam; and
   a recording layer provided on the substrate on which at least one optically detectable change is caused by irradiating the light beam;
   wherein the first and second tracks have an information recording area and an address area having a control information for the information recording area in a direction of the tracks,
   the address area comprises address pits in a part of the first tracks, the address pits being formed in a pattern,
   a track pitch of the first tracks is smaller than 1.2 µm,
   a width of the first tracks is smaller than a width of the second tracks, and
   the address area includes at least two zones located in the direction of the tracks, and the first tracks comprise the address pits in at least one of the zones.

4. An optical information recording medium according to claim 3, wherein the first tracks in the zone adjoining the zone with the address pits have a continuous shape.

5. An optical information recording medium according to claim 4, wherein a width of the first tracks in the zone with the address pits in a direction perpendicular to the first tracks is smaller than a width of the first tracks in the information recording area.

6. An optical information recording medium according to claim 4, wherein a width of the address pits in the zone where the address pits adjoins the first tracks having the continuous shape in a direction perpendicular to the tracks is larger than a width of the first tracks in the information recording area.

7. An optical information recording medium according to claim 2, wherein the first face of the first tracks having the address pits projects toward the incident light beam.

8. An optical information recording medium comprising:
   a substrate including first tracks having a first face and second tracks having a second face, the first face and the second face being optically at different positions in a direction of an incident light beam; and
   a recording layer provided on the substrate on which at least one optically detectable change is caused by irradiating the light beam;
   wherein the first and second tracks have an information recording area and an address area having a control information for the information recording area in a direction of the tracks,
   the address area comprises address pits in a part of the first tracks, the address pits being formed in a pattern,
   a track pitch of the first tracks is smaller than 1.2 µm,
   a width of the first tracks is smaller than a width of the second tracks, and the first and second tracks further have an address start zone provided prior to the address area indicating a start of the address area, and in the address start zone, patterns of the tracks adjoining to each other are identical.

9. An optical information recording medium comprising:

a substrate including first tracks having a first face and second tracks having a second face, the first face and the second face being optically at different positions in a direction of an incident light beam; and a recording layer provided on the substrate on which at least one optically detectable change is caused by irradiating the light beam;

wherein the first and second tracks have an information recording area and an address area having a control information for the information recording area in a direction of the tracks, the address area comprises address pits in a part of the first tracks, the address pits being formed in a pattern, the address area includes at least two zones located in the direction of the tracks, and in the address area, a pattern of the address pits of the first track in at least one of the zones is identical to a pattern of the next first track.

10. An optical information recording medium according to claim 9, wherein the address area includes three zones, and in the zone where the first tracks comprises first address pits, one of the adjacent first tracks includes address pits having a pattern identical to a pattern of the first address pits, and the other of the adjacent first tracks has a continuous shape.

11. An optical information recording medium according to claim 10, wherein a width of the first tracks in the zone where the address pits adjoins the first tracks having the continuous shape in a direction perpendicular to the first tracks is smaller than a width of the first tracks in the information recording area.

12. An optical information recording medium according to claim 10, wherein a width of the address pits in the zone where the address pits adjoins the first tracks having the continuous shape in a direction perpendicular to the tracks is larger than a width of the first tracks in the information recording area.

13. An optical information recording medium according to claim 9, wherein the address area includes two zones, and each of the first tracks has address pits in both of the zones.

14. An optical information recording medium comprising:

a substrate including first tracks having a first face and second tracks having a second face, the first face and the second face being optically at different positions in a direction of an incident light beam, both of the first and second tracks being used for recording information; and a recording layer provided on the substrate on which at least one optically detectable change is caused by irradiating the light beam;

wherein the first and second tracks have an information recording area and an address area, the address area of the first track having a control information for the information recording area in a direction of the tracks, a width of the first tracks is identical to a width of the second tracks, and the address area comprises address pits formed exclusively in a part of the first tracks, the address pits being formed in a pattern.

15. An optical information recording medium comprising:

a substrate including first tracks having a first face and second tracks having a second face, the first face and the second face being optically at different positions in a direction of an incident light beam, both of the first and second tracks being used for recording information; and a recording layer provided on the substrate on which at least one optically detectable change is caused by irradiating the light beam;

wherein the first and second tracks have an information recording area and an address area having a control information for the information recording area in a direction of the tracks;

a width of the first tracks is identical to a width of the second tracks, the address area comprises address pits in a part of the first tracks, the address pits being formed in a pattern, and the address area includes at least two zones located in the direction of the tracks, the first tracks comprise the address pits in at least one of the zones, and the first tracks in the zone adjoining the zone with the address pits have a continuous shape.

16. An optical information recording medium according to claim 15, wherein a width of the first tracks in the zone where the address pits adjoins the first tracks having the continuous shape in a direction perpendicular to the first tracks is smaller than a width of the first tracks in the information recording area.

17. An optical information recording medium according to claim 15, wherein a width of the address pits in the zone where the address pits adjoins the first tracks having the continuous shape in a direction perpendicular to the tracks is larger than a width of the first tracks in the information recording area.

18. An optical information recording medium comprising:

a substrate including first tracks having a first face and second tracks having a second face, the first face and the second face being optically at different positions in a direction of an incident light beam, both of the first and second tracks being used for recording information; and a recording layer provided on the substrate on which at least one optically detectable change is caused by irradiating the light beam;

wherein the first and second tracks have an information recording area and an address area having a control information for the information recording area in a direction of the tracks, a width of the first tracks is identical to a width of the second tracks, the address area comprises address pits in a part of the first tracks, the address pits being formed in a pattern, and the address area includes at least two zones located in the direction of the tracks, and in the address area, a pattern of the address pits of the first track in at least one of the zones is identical to a pattern of the next first track.

19. An optical information recording medium according to claim 18, wherein the address area includes three zones, and in the zone where the first tracks comprises first address pits, one of the adjacent first tracks includes address pits having a pattern identical to a pattern of the first address pits and the other of the adjacent first tracks has a continuous shape.

20. An optical information recording medium according to claim 18, wherein the address area includes two zones, and each of the first tracks has address pits in both of the zones.

21. An optical information recording medium comprising:

a substrate including first tracks having a first face and second tracks having a second face, the first face and the second face being optically at different positions in a direction of an incident light beam, both of the first and second tracks being used for recording information; and a recording layer provided on the substrate on which at least one optically detectable change is caused by irradiating the light beam;

wherein the first and second tracks have an information recording area and an address area having a control information for the information recording area in a direction of the tracks, a width of the first tracks is identical to a width of the second tracks, the address area comprises address pits in a part of the first tracks, the address pits being formed in a pattern, and the first and second tracks further have an address start zone provided prior to the address area indicating a start of the address area, and in the address start zone, patterns of the tracks adjoining to each other are identical.

22. An optical information recording/reproducing apparatus for reproducing an information signal be irradiating a laser light beam onto a recording medium, the recording medium comprising:

a substrate including first tracks having a first face and second tracks having a second face, the first face and the second face being optically at different positions in a direction of an incident light beam; and a recording layer provided on the substrate on which at least one optically detectable change is caused by irradiating the light beam;

wherein the first and second tracks have an information recording area and an address area having a control information for the information recording area in a direction of the tracks, and the address area comprises address pits in a part of the first tracks, the address pits being formed in a pattern;

the apparatus comprising:

light detecting means for detecting a reflected light from the recording medium;

tracking means for focusing the incident light beam onto the second track based on an output from the light detecting means; and address demodulating means for demodulating an address signal from the address pits formed in the address area by comparing the output from the light detecting means with a reference level.

23. An optical information recording/reproducing apparatus according to claim 22, wherein the address demodulating means comprises:

gate generating means for generating a gate signal including a plurality of address reproducing gate pulses each having a predetermined time period;

gate arranging means for making the gate signal synchronized with a reproduced address signal; and gate selecting means for selecting one specified gate pulse by comparing a level of the reproduced address signal or an error rate included in the synchronized gate signal among the plurality of address reproducing gate pulses;

wherein the address signal is demodulated using the reproduced address signal in the selected gate pulse.

24. An optical information recording/reproducing apparatus according to claim 22, wherein the recording medium has an address start zone provided prior to the address area indicating a start of the address area, and in the address start zone, patterns of the tracks adjoining to each other are identical, and the apparatus further comprising:

address start recognizing means for identifying the address start zone from the output of the light detecting means; and gate generating means for generating a gate pulse having a predetermined time period delayed from an output of the address start recognizing means by a predetermined time period, wherein the address demodulating means demodulated the address signal from a change in signal level occurring in the gate pulse.

25. An optical information recording/reproducing apparatus for reproducing an information signal by irradiating a laser light beam onto a recording medium, the recording medium comprising:

a substrate including first tracks having a first face and second tracks having a second face, the first face and the second face being optically at different positions in a direction of an incident light beam; and a recording layer provided on the substrate on which at least one optically detectable change is caused by irradiating the light beam;

wherein the first and second tracks have an information recording area and an address area having a control information for the information recording area in a direction of the tracks, and the address area comprises address pits in a part of the first tracks, the address pits being formed in a pattern, the apparatus comprising:

light detecting means for detecting a reflected light from the recording medium, the detecting means divided in a direction perpendicular to the direction of the tracks;

tracking means for focusing the incident light beam onto the second track based on an output from the light detecting means;

summing means for obtaining a summation signal of the outputs from the light detecting means;

differential means for obtaining a differential signal of the outputs from the light detecting means;

absolute value means for obtaining an absolute value signal of an output from the differential means;

address demodulating means for demodulating an address signal by comparing an output from the absolute value means with a first reference level; and information demodulating means for demodulating an information recorded on the recording layer by comparing a differential signal between an output from the summing means and the output from the absolute value means with a second reference level.

26. An optical information recording/reproducing apparatus for reproducing an information signal by irradiating a laser light beam onto a recording medium, the recording medium comprising:

a substrate including first tracks having a first face and second tracks having a second face, the first face and the second face being optically at different positions in a direction of an incident light beam, both of the first and second tracks being used for recording information; and a recording layer provided on the substrate on which at least one optically detectable change is caused by irradiating the light beam;

wherein the first and second tracks have an information recording area and an address area having a control information for the information recording area in a direction of the tracks, a width of the first tracks is identical to a width of the second tracks, and the address area comprises address pits in a part of the first tracks, the address pits being formed in a pattern, the apparatus comprising:

an optical system for irradiating the light beam on the recording medium;

tracking error detecting means for detecting an offset between a target track and the light beam based on a reflected light or a transmitted light from the recording medium;

tracking controlling means for moving the incident light beam to scan the track based on an output from the tracking error detecting means;

inverting means for inverting a polarity of the tracking controlling means dependent on whether the first tracks or the second tracks are scanned;

signal level comparing means having a reference level, the reference level changing into at least two levels in accordance with the inverted polarity through the inverting means; and address demodulating means for demodulating an address signal from an output from the signal level.

\* \* \* \* \*

UNITED STATES PATENT AND TRADE MARK OFFICE
CERTIFICATE OF CORRECTION

PATENT NO. : 5,517,485
DATED : May 14, 1996
INVENTOR(S) : Nishiuchi et al.

It is certified that error appears in the above-identified patent and that said Letters Patent is hereby corrected as shown below:

On the title page, item [57] Abstract, line 15, "an" should be --a--.

In column 25, line 28, "be" should be --by--.

Signed and Sealed this

Twenty-sixth Day of November 1996

Attest:

BRUCE LEHMAN

Attesting Officer

Commissioner of Patents and Trademarks